US011985487B2

(12) United States Patent
Maruri et al.

(10) Patent No.: US 11,985,487 B2
(45) Date of Patent: May 14, 2024

(54) METHODS AND APPARATUS TO ENHANCE AN AUDIO SIGNAL

(71) Applicant: Intel Corporation, Santa Clara, CA (US)

(72) Inventors: Hector Cordourier Maruri, Guadalajara (MX); Willem Beltman, West Linn, OR (US); Jose Rodrigo Camacho Perez, Guadalajara (MX); Paulo Lopez Meyer, Zapopan (MX); Julio Zamora Esquivel, West Sacramento, CA (US); Alejandro Ibarra Von Borstel, Manchaca, TX (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 17/710,955

(22) Filed: Mar. 31, 2022

(65) Prior Publication Data

US 2022/0225023 A1 Jul. 14, 2022

(51) Int. Cl.

| | |
|---|---|
| ***H04R 3/00*** | (2006.01) |
| ***G10L 25/18*** | (2013.01) |
| ***G10L 25/30*** | (2013.01) |
| ***H04R 1/40*** | (2006.01) |
| ***H04R 29/00*** | (2006.01) |

(52) U.S. Cl.

CPC .............. *H04R 3/005* (2013.01); *G10L 25/18* (2013.01); *G10L 25/30* (2013.01); *H04R 1/406* (2013.01); *H04R 29/005* (2013.01); *H04R 2430/03* (2013.01)

(58) Field of Classification Search

CPC ...... H04R 3/005; H04R 1/406; H04R 29/005; H04R 2430/03; G10L 25/18; G10L 25/30

USPC ............................ 381/56, 58, 91, 71.1, 73.1

See application file for complete search history.

(56) References Cited

U.S. PATENT DOCUMENTS

| | | | | |
|---|---|---|---|---|
| 9,924,265 | B2 | 3/2018 | Lopez Meyer et al. | |
| 2010/0027805 | A1* | 2/2010 | Itou .................. | G10K 11/17881 381/71.12 |
| 2011/0091056 | A1* | 4/2011 | Nishizaki ............. | H04R 25/554 381/312 |

(Continued)

*Primary Examiner* — William A Jerez Lora

(74) *Attorney, Agent, or Firm* — Hanley, Flight & Zimmerman, LLC

(57) ABSTRACT

Methods, apparatus, systems, and articles of manufacture are disclosed to enhance and audio signal. An example apparatus includes processor circuitry to at least determine a first signal spectrum corresponding to a first microphone, the first signal spectrum identifying first audio, determine a second signal spectrum corresponding to a second microphone, the second signal spectrum identifying the first audio, the second spectrum different from the first spectrum, the first microphone different from the second microphone, the second signal spectrum having a first spectral distance to the first signal spectrum, calculate a mask based on the first and second signal spectrums, and generate a third signal spectrum corresponding to the first microphone utilizing the mask and the first signal spectrum, the third signal spectrum different from the first signal spectrum, the third signal spectrum having a second spectral distance to the second signal spectrum, the second spectral distance less than the first spectral distance.

25 Claims, 19 Drawing Sheets

(56) References Cited

U.S. PATENT DOCUMENTS

| | | | | |
|---|---|---|---|---|
| 2013/0253923 | A1* | 9/2013 | Mustiere | H04R 3/005 704/E21.002 |
| 2017/0078464 | A1 | 3/2017 | Cordourier Maruri et al. | |
| 2022/0286775 | A1* | 9/2022 | Nakadai | H04R 5/04 |

* cited by examiner

METHODS AND APPARATUS TO ENHANCE AN AUDIO SIGNAL

FIELD OF THE DISCLOSURE

This disclosure relates generally to audio signals and, more particularly, to methods and apparatus to enhance an audio signal.

BACKGROUND

Many existing electronic devices include one or more microphones to detect sounds in a surrounding environment. Different microphones, including microphones with various qualities, can record different audio signals from an audio source.

BRIEF DESCRIPTION OF THE DRAWINGS

In general, the same reference numbers will be used throughout the drawing(s) and accompanying written description to refer to the same or like parts. The figures are not to scale.

Figure 1:
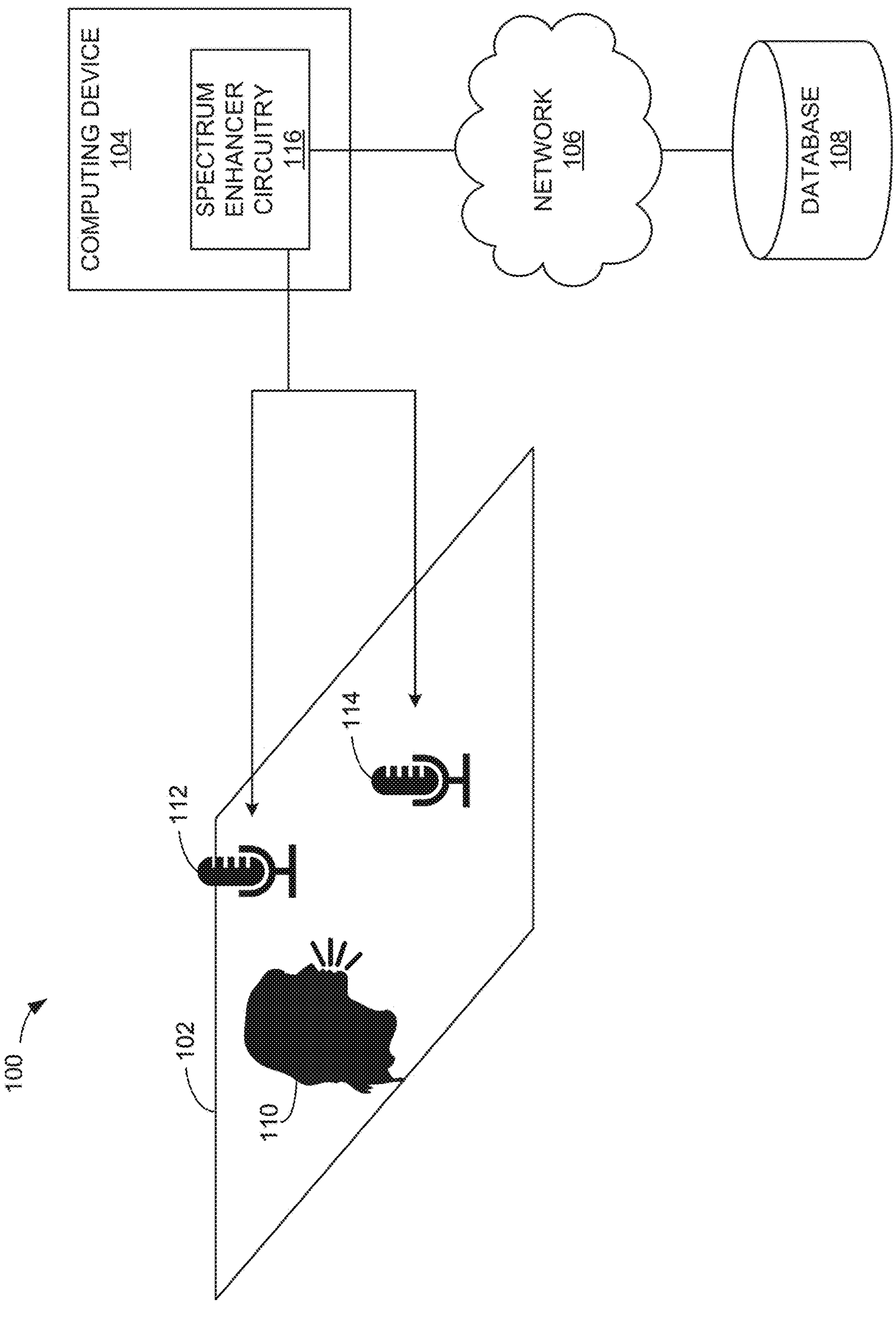
FIG. 1 illustrates an example environment including an example system in which teachings of this disclosure can be implemented.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Microphone quality can be determined by the sensitivity and the frequency response of the device. In general, high-quality microphones have a higher dynamic range (DR), higher frequency response at relatively extreme frequencies, a flatter (e.g., more balanced) frequency response on the overall audible frequency range, and very low distortion across different amplitudes and frequencies. These advantages of higher quality microphones correspond to their high price. Additionally, high quality microphones are defined by high directivity (e.g., sensitivity to sound in a specific direction), as seen in boom mics, or high omnidirectionality (e.g., sensitivity to sound equally from multiple directions), as seen in high quality sonometer mics, which contribute to the higher costs of high quality microphones. The components of a high quality microphone can also increase costs of assembly and manufacture. For example, the metal diaphragm in a microphone is needed for capacitive and dynamic sensing as well as the electric/magnetic field creation and detection, and the circuitry needed for the preamplifier both require expensive materials (e.g., high quality electric dielectrics, neodymium magnets, etc.).

In some examples, the high cost of high quality microphones is due to reputation and marketing of the device. High quality microphones and interfaces are among the most expensive devices for any audio-visual application. This often excludes users in middle or low income demographics from the market and severely reduces the Total-Available-Market (TAM).

Lower quality microphones have lower bandwidth and lower dynamic range and, thus, are considerably less expensive than high quality microphones. For example, a microelectromechanical (MEM) microphone can cost USD$ 1, but will not perform at the same level as a USD$ 1000 higher quality microphone (e.g., AKG C1000 mic). However, lower cost microphones (e.g., MEM microphones, electret microphones, etc.) have relatively good performance and are included in many devices that require audio input, such as headphones, smartphones, laptops, smart speakers, tablets, etc. Although a lower cost/lower quality microphone will have inferior spectral performance to a higher quality microphone, the signal to noise ratio (SNR) can be similar.

Prior techniques to avoid expensive microphone equipment include utilizing large microphone arrays with multiple input audio channels. However, such microphone arrays require extensive signal processing integration to improve the audio dynamic range and require additional operating equipment that can raise the cost. Additionally, the use of noise reduction algorithms can process the audio stream to increase the SNR and the dynamic range of a lower cost microphone. However, noise reduction algorithms cannot increase frequency response (e.g., cannot generate spectrum information) and can negatively affect the balance of the frequency response.

Examples disclosed herein utilize a deep-learning, audio signal transformation, which processes an audio signal obtained with a low cost/low quality microphone (e.g., MEM, electret, etc.) and produces an enhanced audio signal that emulates the output of a high quality microphone. Examples disclosed herein enable high quality sound (e.g., high quality audio signals, high bandwidth, high dynamic range, improved frequency response, etc.) for devices with low cost/low quality microphones. Examples disclosed herein allow for high quality audio signals using inexpensive equipment, which increases the TAM for devices, servers, products, etc. Examples disclosed herein allow a deep learning system to estimate missing information (e.g., bandwidth, range, etc.) such that a low cost microphone output to be similar to a high cost microphone output.

Examples disclosed herein utilize an "audio signal" to denote an electronic representation of a sound wave. Audio signals can be described in the time domain or in the frequency domain. In the time domain, an audio signal is graphically represented with varying amplitudes of a sound over a period of time (e.g., loudness). In the frequency domain, an audio signal is described in terms of how much of the audio signal exists within a given frequency range. The frequency domain graphically represents an audio signal with amplitude as a function of frequency. In the frequency domain, frequencies that are present in the audio signal can be identified and frequencies that are absent from the audio signal can be identified. Thus, the frequency domain is useful for analyzing audio signal properties. As used herein, an "audio spectrum," a "signal spectrum", and/or a "spectrum" refers to the frequency domain representation of an audio signal. Additionally, as used herein, spectrums can be represented by vectors. Audio signals can be converted from the time domain to the frequency domain via the Fourier Transform.

As used herein, a "spectral distance" refers to a mathematical calculation for comparing signal spectrums. A spectral distance from a first signal spectrum to a second signal spectrum is a distance measurement that quantifies the similarities (e.g., overlap, commonalities, etc.) between the spectrums. More similar signal spectrums will have a low spectral distance and less similar signal spectrums will have a high spectral distance.

As used herein, a "audio mask," "spectral mask", and/or a "mask" is a mathematical factor to describe a ratio between data points of audio spectrums. The values of the spectral mask can be bounded from 0 to 1. A spectral mask can also be represented as a vector.

As used herein, "dynamic range" refers to the SNR of a microphone. Additionally or alternatively, the dynamic range of a microphone refers to the range of amplitudes corresponding to a microphone. For example, a microphone with high dynamic range has a high SNR and/or can manage relatively high variation of amplitudes. However, a microphone with low dynamic range has a low SNR and/or is limited to relatively smaller ranges of amplitudes. In some examples, a low quality microphone is associated with low dynamic range. However, a high quality microphone is associated with high dynamic range.

As used herein, "bandwidth" refers to the range of frequencies corresponding to a microphone. For example, a microphone with high bandwidth can manage relatively high ranges of frequencies. However, a microphone with low bandwidth is limited to relatively low ranges of frequencies and has difficulty detecting high frequencies. In some examples, a low quality microphone is associated with low bandwidth. However, a high quality microphone is associated with high bandwidth.

Examples disclosed herein include processor circuitry to execute the instructions to at least determine a first signal spectrum corresponding to a first microphone (e.g., the low quality microphone), the first signal spectrum identifying first audio from a first audio source, determine a second signal spectrum corresponding to a second microphone (e.g., the high quality microphone), the second signal spectrum identifying the first audio, the second signal spectrum different from the first signal spectrum, the first microphone different from the second microphone, the second signal spectrum having a first spectral distance to the first signal spectrum, calculate a mask based on the first and second signal spectrums, and generate a third signal spectrum corresponding to the first microphone utilizing the mask and the first signal spectrum, the third signal spectrum different from the first signal spectrum, the third signal spectrum having a second spectral distance to the second signal spectrum, the second spectral distance less than the first spectral distance.

FIG. 1 illustrates an example environment of use including an example system 100 in which teachings of this disclosure can be implemented. In the illustrated example of FIG. 1, the system 100 includes an example recording arrangement 102, an example computing device 104, an example network 106, and an example database 108. The example recording arrangement 102 includes an example audio source 110, an example first microphone 112, and an example second microphone 114. The example computing device 104 includes example spectrum enhancer circuitry 116.

In the illustrated example of FIG. 1, the example microphones 112, 114 record audio from the audio source 110. The example recording arrangement 102 is set up such that the microphones 112, 114 can record the same audio content from the source 110. In some examples, the microphones 112, 114 output different qualities of the sound. For example, the microphone 112 can be a low quality and/or low cost microphone (e.g., MEM, electret, etc.) and the microphone 114 can be a high quality and/or high cost microphone (e.g., AKG C1000 mic). The audio source 110 can be human speech, music, etc.

In some examples, the recording arrangement 102 can be an anechoic chamber with the microphones 112, 114 positioned 1 meter (m) away from the audio source 110. However, the recording arrangement can be any positioning of the microphones 112, 114 with respect to the audio source 110. The microphones 112, 114 transmit data (e.g., audio signals) to the computing device 104.

The device 104 can be implemented by any suitable device capable of signal processing (e.g., a laptop computer, a mobile phone, a desktop computer, a server, smart speakers used by dialog agents, wearable devices, etc.). In some examples, the device 104 can be integrated with one or more of the microphones 112, 114 and/or the audio source 110. Additionally or alternatively, the device 104 can receive the audio signals from the microphones 112, 114 remotely (e.g., over the network 106). In some examples, the audio source 110 is a piezoelectric sensor. The device 104 includes the spectrum enhancer circuitry 116 to generate an emulated high quality audio signal.

The spectrum enhancer circuitry 116 processes the audio signals generated by the microphones 112, 114. For example, the spectrum enhancer circuitry 116 uses a Fourier Transform to convert the audio signals from the time domain to the frequency domain. In some examples, the spectrum enhancer circuitry 116 generates signal spectrums for each of the audio signals from the microphones 112, 114. In the illustrated example of FIG. 1, the spectrum enhancer circuitry 116 is connected to the database 108 via the example network 106. The example network 106 enables the spectrum enhancer circuitry 116 to store data associated with the microphones 112, 114 in the database 108. In some examples, the database 108 can store audio signals, signal spectrums, spectral masks, spectral distances, microphone properties, audio information, etc. An example implementation of the spectrum enhancer circuitry 116 is described below in FIG. 2.

Figure 2:
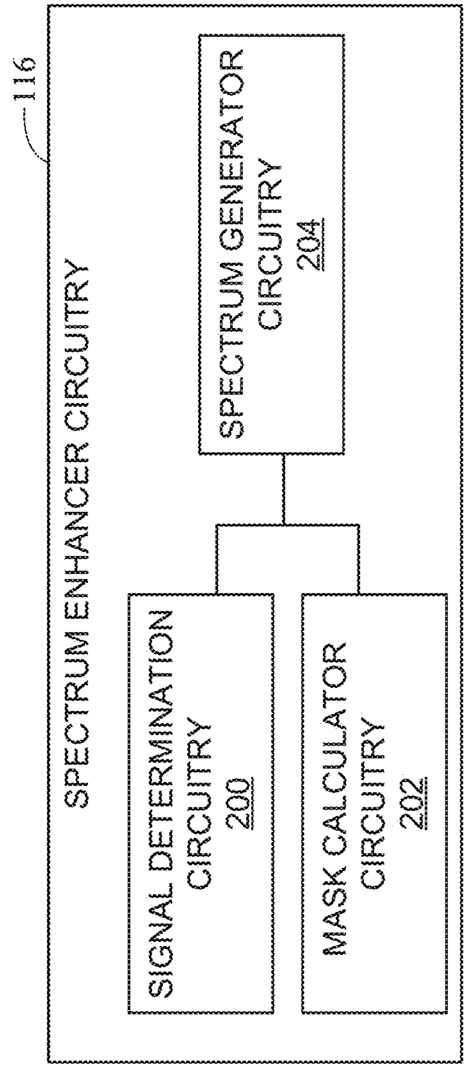
FIG. 2 is a block diagram of example spectrum enhancer circuitry included in the system of claim 1.

FIG. 2 is a block diagram of the spectrum enhancer circuitry 116 to enhance the audio signal of a microphone (e.g., the low quality microphone 112). The spectrum enhancer circuitry 116 of FIGS. 1 and 2 may be instantiated (e.g., creating an instance of, bring into being for any length of time, materialize, implement, etc.) by processor circuitry such as a central processing unit executing instructions. Additionally or alternatively, the spectrum enhancer circuitry 116 of FIGS. 1 and 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The spectrum enhancer circuitry 116 of the example of FIGS. 1 and 2 includes signal determination circuitry 200, mask calculator circuitry 202, and spectrum generator circuitry 204.

The signal determination circuitry 200 determines (e.g., calculates) the signal spectrums corresponding to each of the microphones (e.g., the microphones 112, 114) to identify audio (e.g., the audio source 110). In some examples, the signal determination circuitry 200 obtains audio signals from the microphones 112, 114 when the microphones 112, 114 have recorded audio from the audio source 110. In some examples, the signal determination circuitry 200 utilizes the Fourier Transform to convert the audio signals corresponding to each of the microphones 112, 114 into signal spectrums, such that the audio signals are described in the frequency domain. The signal spectrums calculated by the signal determination circuitry 200 can include amplitudes and frequencies corresponding to the audio source 110. In some examples, the signal determination circuitry 200 can determine a first signal spectrum and a second signal spectrum corresponding to each of the microphones 112, 114, such that the second signal spectrum has a spectral distance to the first signal spectrum. For example, the signal determination circuitry 200 determines the distance between (e.g., overlap) signal spectrums based on a spectral distance calculation. In some examples, the signal determination circuitry 200 determines spectrums with varying dynamic ranges and/or bandwidth (e.g., sound qualities, audio qualities, recording quality, etc.). For example, the first microphone 112 can have a first dynamic range and the second microphone 114 can have a second dynamic range, the second dynamic range greater than the first dynamic range. Additionally or alternatively, the first microphone 112 can have a first bandwidth and the second microphone 114 can have a second bandwidth, the second bandwidth greater than the first bandwidth.

In some examples, the spectrum enhancer circuitry 116 includes means for determining signal spectrums. For example, the means for determining may be implemented by the signal determination circuitry 200. In some examples, the signal determination circuitry 200 may be instantiated by processor circuitry such as the example processor circuitry 1612 of FIG. 16. For instance, the signal determination circuitry 200 may be instantiated by the example general purpose processor circuitry 1700 of FIG. 17 executing machine executable instructions such as that implemented by at least blocks 1402, 1404 of FIG. 14. In some examples, the signal determination circuitry 200 may be instantiated by hardware logic circuitry, which may be implemented by an ASIC or the FPGA circuitry 1800 of FIG. 18 structured to perform operations corresponding to the machine readable instructions. Additionally or alternatively, the signal determination circuitry 200 may be instantiated by any other combination of hardware, software, and/or firmware. For example, the signal determination circuitry 200 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example mask calculator circuitry 202 calculates a mask (e.g., audio mask, spectral mask, etc.) based on the signal spectrums corresponding to each of the microphones 112, 114. In some examples, the mask is a ratio between signal spectrums. For example, the mask calculator circuitry 202 utilizes the amplitudes and frequencies recorded between signal spectrums to calculate the mask (e.g., ratio between amplitudes of the spectrums, ratio between frequencies of the spectrums, etc.). In some examples, the audio mask (e.g., ratio) is a factor bounded from 0 to 1.

In some examples, the spectrum enhancer circuitry 116 includes means for calculating a mask. For example, the means for calculating may be implemented by the mask calculator circuitry 202. In some examples, the mask calculator circuitry 202 may be instantiated by processor circuitry such as the example processor circuitry 1612 of FIG. 16. For instance, the mask calculator circuitry 202 may be instantiated by the example general purpose processor circuitry 1700 of FIG. 7 executing machine executable instructions such as that implemented by at least blocks 1406 of FIG. 14 and blocks 1500, 1502, 1504 of FIG. 15. In some examples, mask calculator circuitry 202 may be instantiated by hardware logic circuitry, which may be implemented by an ASIC or the FPGA circuitry 1800 of FIG. 18 structured to perform operations corresponding to the machine readable instructions. Additionally or alternatively, the mask calculator circuitry 202 may be instantiated by any other combination of hardware, software, and/or firmware. For example, the mask calculator circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example spectrum generator circuitry 204 generates a signal spectrum (e.g., an enhanced signal spectrum) corresponding to at least one of the microphones 112, 114. In some examples, the spectrum generator circuitry 204 can utilize the mask (e.g., audio mask, spectral mask, etc.) to generate the signal spectrum. For example, the spectrum generator circuitry 204 can generate an enhanced signal spectrum corresponding to the first microphone 112 (e.g., the low quality microphone) utilizing the mask calculated between the signal spectrums of the first microphone 112 and the second microphone 114. In some examples, the spectrum generator circuitry 204 can multiply the signal spectrum for the first microphone 112 (e.g., the first signal spectrum) by the mask to generate the enhanced signal spectrum for the first microphone 112. In some examples, the spectrum generator circuitry 204 can generate an enhanced audio signal corresponding to the enhanced signal spectrum using the inverse Fourier Transform. Additionally or alternatively, the spectrum generator circuitry 204 can generate a signal spectrum (e.g., enhanced signal spectrum) based on the spectral distance between the microphones 112, 114. For example, the signal spectrums corresponding to the microphones 112, 114 can have a first spectral distance and the enhanced signal spectrum and the first signal spectrum for the first microphone 112 can have a second spectral distance. The second spectral distance can be less than the first spectral distance. Thus, the spectrum generator circuitry 204 can generate an enhanced signal spectrum for at least one of the microphones 112, 114 (e.g., the low quality microphone) such that the enhanced signal spectrum is a higher quality spectrum and/or audio signal for the at least one of the microphones 112, 114. In some examples, the spectrum generator circuitry 204 generates a signal spectrum corresponding to the microphone 112 utilizing the mask for a second audio source different from the audio source 110. For example, the spectrum generator circuitry 204 can utilize the mask to generate enhanced audio signals for different audio sources and/or different audio content corresponding to the first microphone 112.

In some examples, the spectrum enhancer circuitry 116 includes means for generating a signal spectrum. For example, the means for generating may be implemented by the spectrum generator circuitry 204. In some examples, the spectrum generator circuitry 204 may be instantiated by processor circuitry such as the example processor circuitry 1612 of FIG. 16. For instance, the spectrum generator circuitry 204 may be instantiated by the example general purpose processor circuitry 1700 of FIG. 17 executing machine executable instructions such as that implemented by at least block 1408 of FIG. 14. In some examples, spectrum generator circuitry 204 may be instantiated by hardware logic circuitry, which may be implemented by an ASIC or the FPGA circuitry 1800 of FIG. 8 structured to perform operations corresponding to the machine readable instructions. Additionally or alternatively, the spectrum generator circuitry 204 may be instantiated by any other combination of hardware, software, and/or firmware. For example, the spectrum generator circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
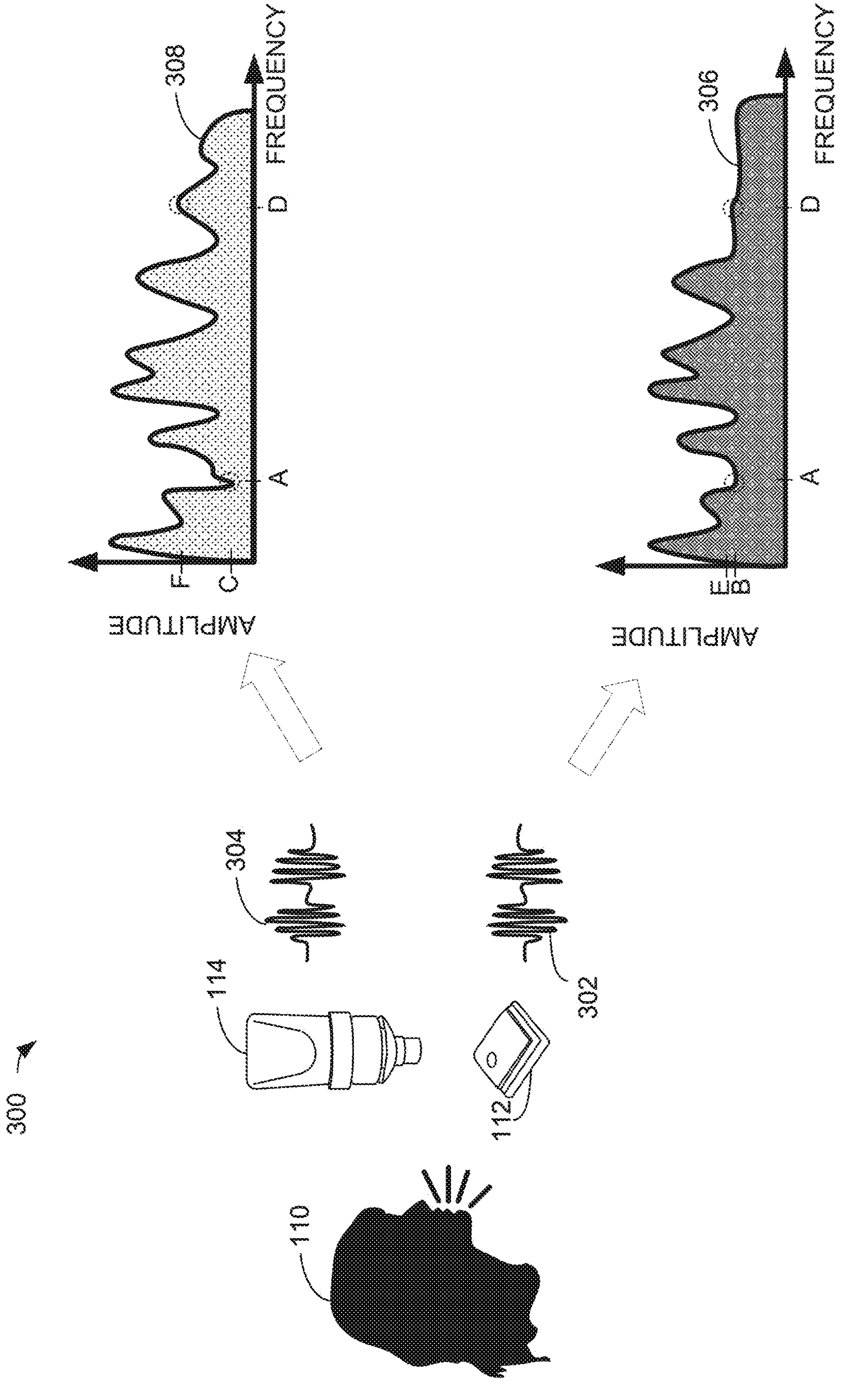
FIG. 3 illustrates an example audio collection schematic for example microphones of the example environment of FIG. 1

FIG. 3 is an example audio collection schematic 300 for the microphones 112, 114 of FIG. 1. The example schematic 300 includes the audio source 110, the first microphone 112, the second microphone 114, a first audio signal 302, a second audio signal 304, a first signal spectrum 306, and a second signal spectrum 308. In the example of FIG. 3, the first microphone 112 represents a low quality and/or low cost microphone 112 and the second microphone 114 represents a high quality and/or high cost microphone 114. The microphones 112, 114 record the same audio content from the source 110. However, the microphones 112, 114 generate different audio signals corresponding to the audio source 110. For example, the low quality microphone 112 will output (e.g., record, generate, etc.) the first audio signal 302 and the high quality microphone 114 will output the second audio signal 304, the first audio signal 302 different from the second audio signal 304.

In the example schematic 300 of FIG. 3, the audio signals 302, 304 are converted to the frequency domain via the Fourier Transform. For example, the audio signals 302, 304 are described in the frequency domain as the first signal spectrum 306 and the second signal spectrum 308, respectively. The first signal spectrum 306 corresponds to the first audio signal 302 and the low quality microphone 112. The second signal spectrum 308 corresponds to the second audio signal 304 and the second microphone 114. The example spectrums 306, 308 are graphically represented to describe the audio signal with amplitude as a function of frequency. For each of the spectrums 306, 308, an amplitude is identified for each of the frequencies of the audio signal. For example, for frequency A, the first spectrum 306 identifies an amplitude B and the second spectrum 308 identifies an amplitude C. Additionally or alternatively, for frequency D, the first spectrum 306 identifies an amplitude E and the second spectrum 308 identifies an amplitude F. Each of the spectrums 306, 308 can be described in vector format such that values of amplitudes are identified across a range of frequencies in the audio. In FIG. 3, the first signal spectrum 306 can be referred to as the low quality spectrum 306 and/or the low cost spectrum 306. Additionally or alternatively, the second spectrum 308 can be referred to as the high quality spectrum 308 and/or the high cost spectrum 308.

Figure 4:
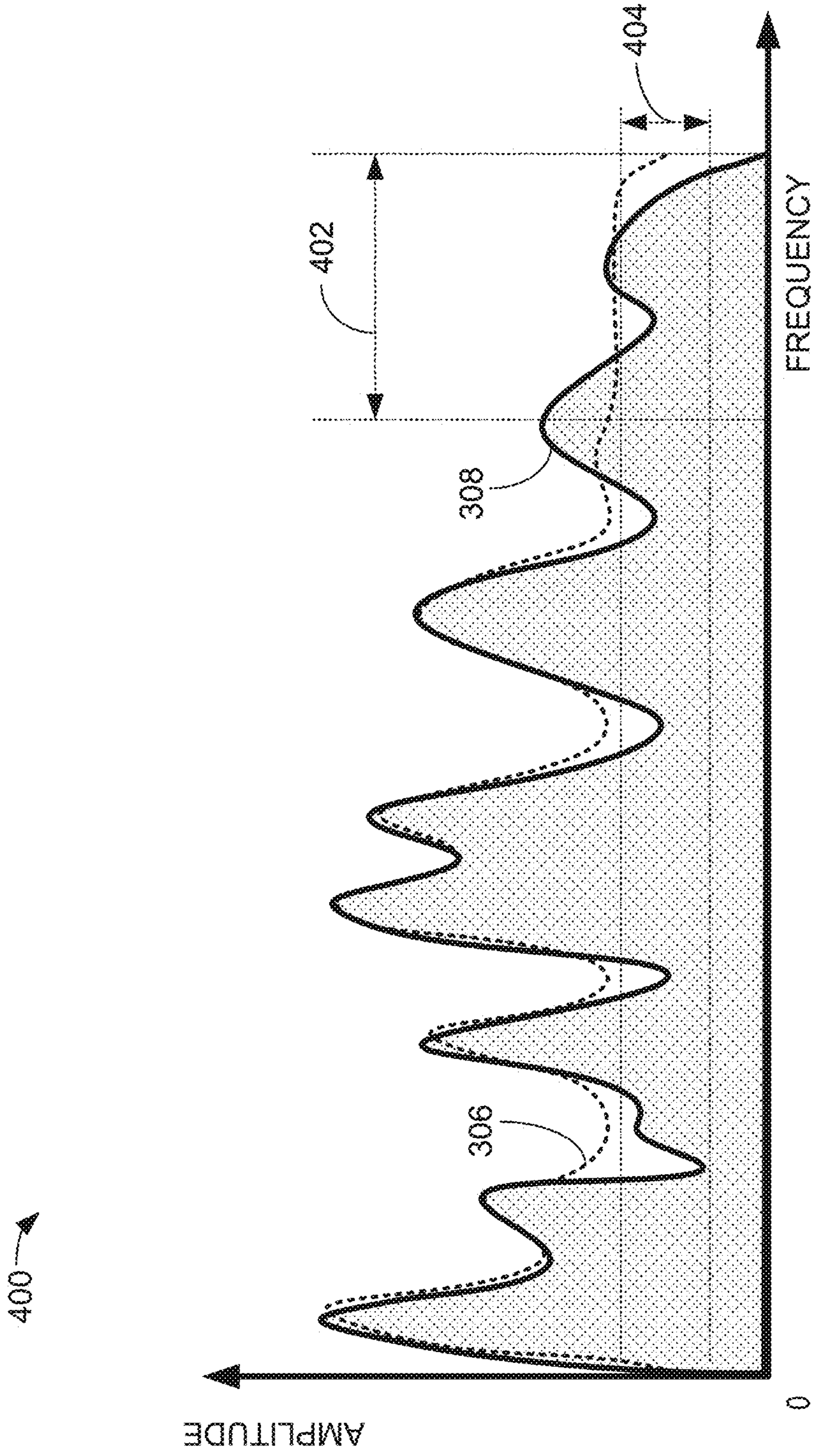
FIG. 4 is a graphical illustration for comparing spectrums corresponding to the example microphones of FIGS. 1 and 3.

FIG. 4 is a graphical illustration 400 showing amplitude as a function of frequency for the spectrums 306, 308 corresponding to the microphones 112, 114. In the example of FIGS. 3 and 4, the spectrum 306 is a lower quality spectrum compared to the spectrum 308. For example, the low quality spectrum 306 has less bandwidth (e.g., records less of the frequencies from the source 110) than the high quality signal spectrum 308. In FIG. 4, this variation in bandwidth is described in at least in region 402. In particular, in region 402, the spectrum 308 can obtain more data (e.g., values of amplitude) at higher frequencies (e.g., more sensitive at higher frequencies). Whereas, the low quality spectrum 306 has low sensitivity (e.g., flatlines, does not collect as much data, etc.) at high frequencies of the audio.

Additionally or alternatively, the low quality spectrum 306 has less dynamic range (e.g., lower range of amplitudes) than the high quality signal spectrum. In FIG. 4, this variation in dynamic range is described in at least region 404. In particular, in region 404, the spectrum 308 has high sensitivity in the lower ranges of amplitude (e.g., can detect lower amplitudes in the audio). Whereas, the low quality spectrum 306 has low sensitivity in the lower ranges of amplitude (e.g., cannot detect lower amplitudes in the audio). Accordingly, the spectrum 306 detects almost none of the low value amplitudes in region 404. The spectrum 308, with higher bandwidth and higher dynamic range, can be identified as the high quality spectrum 308.

Figure 5:
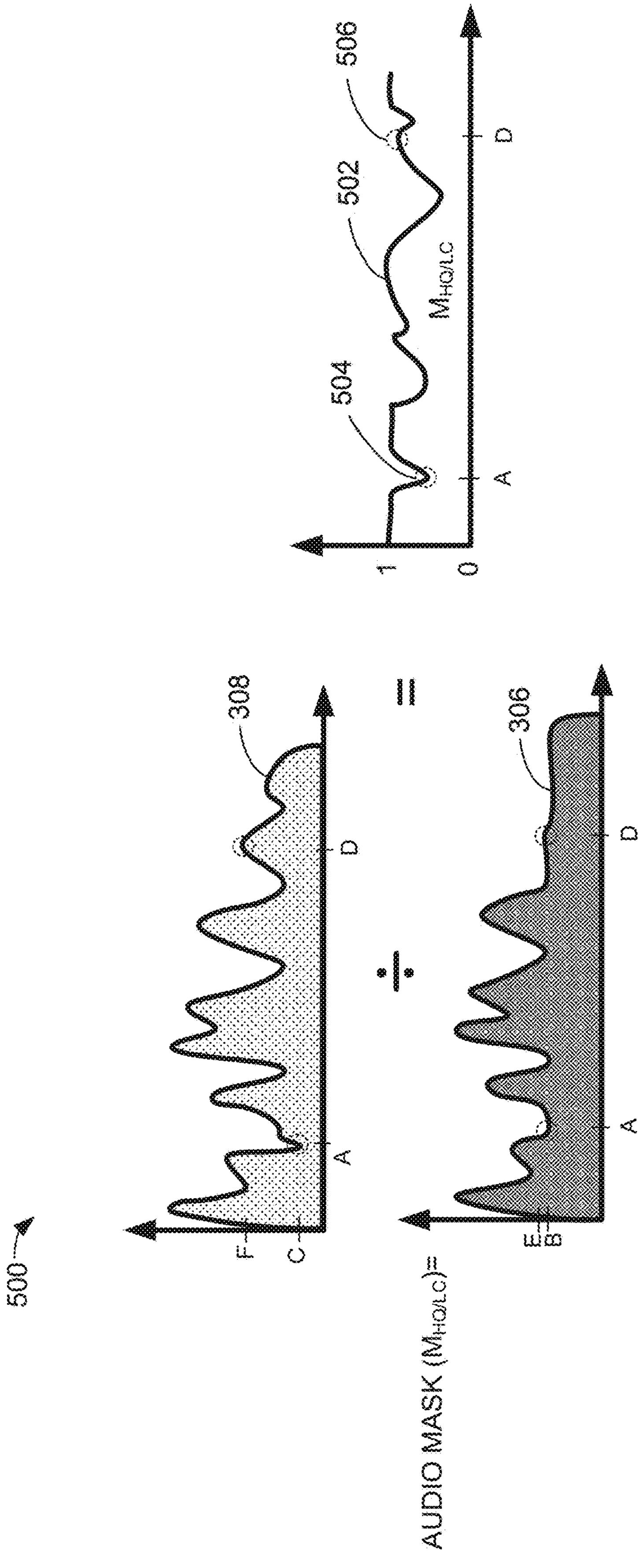
FIG. 5 illustrates an example spectrum mask calculation based on the schematic of FIG. 3.

FIG. 5 illustrates an example spectrum mask calculation 500 based on the schematic 300 of FIG. 3. The example spectrum mask calculation 500 includes the high quality signal spectrum 308, the low quality signal spectrum 306, and a mask 502. In the example of FIG. 4, the example mask calculation 500 calculates the mask 502 by dividing the high quality spectrum 308 by the low quality spectrum 306. For each of the values of frequency identified in the audio, the mask calculation 500 calculates a ratio of amplitudes between the spectrums 306, 308. Example equation 1, described in detail below, represents an example mask calculation in accordance with the teachings of this disclosure.

$$M_{HQ/LQ} = \frac{HQ}{LQ} \quad \text{(Equation 1)}$$

In example equation 1 above, the mask 502 between the high quality spectrum 308 and the low quality spectrum 306 ($M_{HQ/LQ}$s determined as the spectrum 308 (HQ) divided by the spectrum 306 (LQ). In example equation 1 above, the variables ($M_{HQ/LQ}$(HQ), and (LQ) can be in vector format.

For example, for the mask at frequency A, equation 1 can be used to divide the amplitude C by the amplitude B. Additionally or alternatively, for the mask at frequency D, equation 1 can be used to divide the amplitude F by the amplitude E. A mask (e.g., ratio, factor, etc.) for each frequency in the audio is calculated by dividing the corresponding amplitudes of the spectrums 306, 308 (e.g., via equation 1). Accordingly, a mask vector can be described graphically, as seen in plot 502, for a range of frequencies. Additionally or alternatively, the mask between amplitudes C, A is represented at point 504 on the plot 502 and the mask between amplitudes F, E is represented at point 506 on the plot 502. In some examples, the mask 502 can be a factor (e.g., a vector of factors) bounded between 0 and 1.

Figure 6:
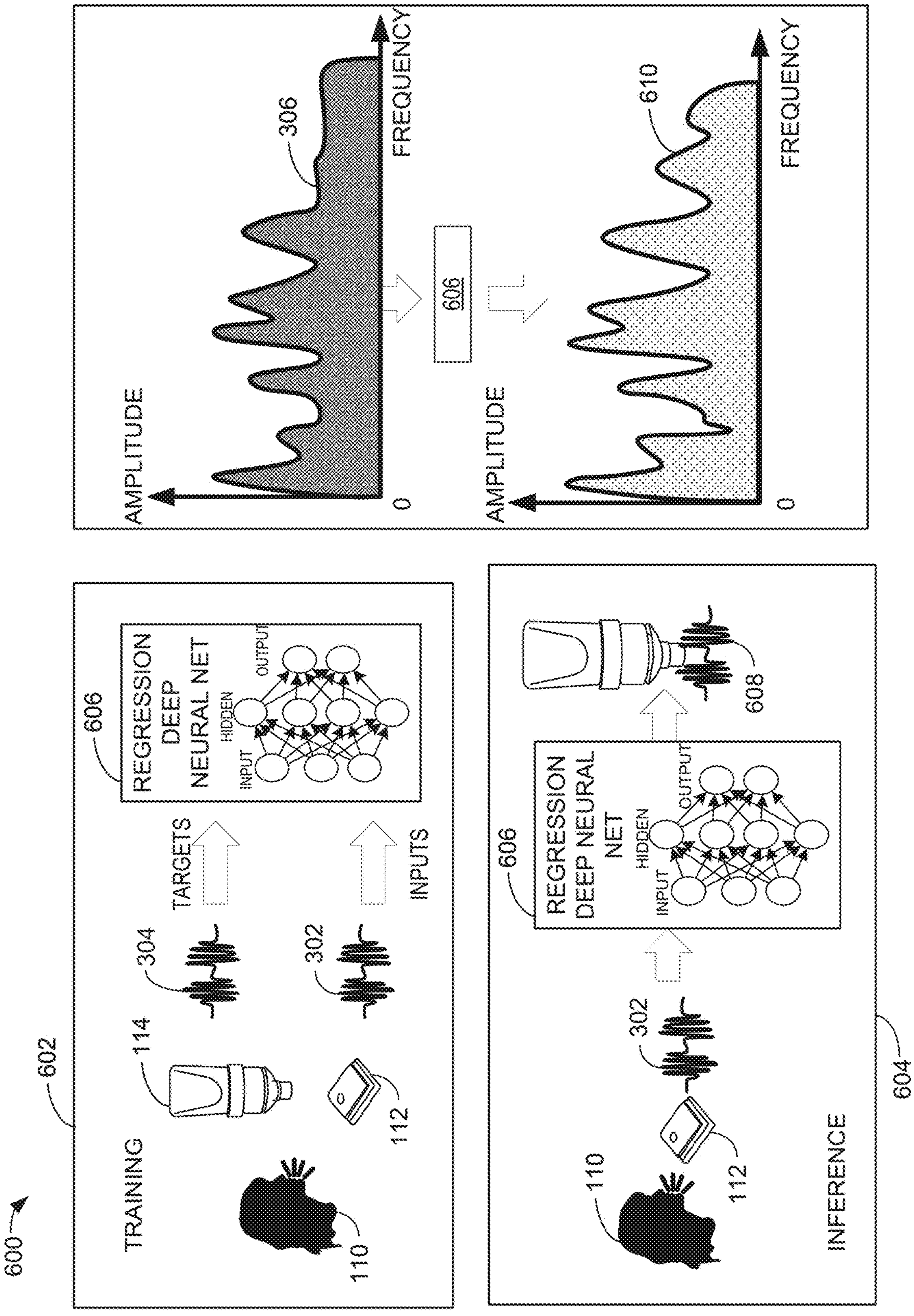
FIG. 6 illustrates an example process flow in which teachings of this disclosure can be implemented.

FIG. 6 is an audio enhancement process flow 600 in which teachings of this disclosure can be implemented. The example process flow 600 includes an example training phase 602 and an example inference phase 604. The example training phase 602 includes the audio source 110, the low quality microphone 112, the high quality microphone 114, the first audio signal 302, the second audio signal 304, and a neural network 606. The example neural network 606 can include the Fourier Transform to convert the signals 302, 304 to the frequency domain (e.g., generate the spectrums 306, 308), mask calculation 500 of FIG. 5, the mask 502, etc. In some examples, the example neural network 606 is a regression deep neural network. However, the neural network 606 enables the spectrum enhancer circuitry 116 to enhance an audio signal. The example neural network 606 is described in further detail below in conjunction with FIG. 7.

The audio enhancement process flow 600 aims to enhance an audio signal (e.g., the audio signal 302) of a low quality microphone (e.g., the microphone 112). In the training phase 602, the neural network 606 (e.g., model) is trained. The high quality microphone 114 and the audio signal 304 are characterized as targets for the neural network 606. Additionally or alternatively, the low quality microphone 112 and the audio signal 302 are characterized as inputs for the neural network 606. In some examples, an output of the training phase 602 is the mask 502.

The example inference phase 604 includes the audio source 110, the low quality microphone 112, the first audio signal 302, the neural network 606, and an enhanced audio signal 608. In the inference phase 604, the trained neural network 606 generates the enhanced audio signal 608 based on the mask 502 and the spectrum 306. Example equation 2, described in detail below, represents an example enhanced spectrum calculation utilizing the mask 502.

$$\widehat{HQ} = M_{HQ/LQ} * LQ \quad \text{(Equation 2)}$$

In example equation 2 above, the enhanced spectrum ( $\widehat{HQ}$ ) is determined as the mask 502 ($M_{HQ/LQ}$) multiplied by the low quality spectrum 306 (LQ). In example equation 2 above, the variables ($\widehat{HQ}$), ($M_{HQ/LQ}$), and (LQ) can be in vector format.

The enhanced audio signal 608 (e.g., emulated audio signal) can be described as an enhanced signal spectrum 610 in the frequency domain via the Fourier Transform. The enhanced signal spectrum 610 includes a higher bandwidth and a higher dynamic range compared to the low quality spectrum 306. Thus, the enhanced signal spectrum 610 is a higher quality signal spectrum corresponding to the low quality microphone 112.

Additionally or alternatively, the enhanced signal spectrum 610 is similar to the high quality signal spectrum 308. In some examples, the similarity (e.g., overlap) between signal spectrums can be described (e.g., calculated) as a spectral distance. Spectral distance calculations are described in further detail below in conjunction with FIG. 12. In the example of FIG. 6, the enhanced audio signal 608 and/or the enhanced signal spectrum 610 corresponds to the audio source 110. However, an enhanced audio signal corresponding to the microphone 112 can be generated for a second audio source different from the audio source 110 via the neural network 606. Thus, via the neural network 606, the low quality microphone 112 can be utilized to create (e.g., record, calculate, generate, etc.) an enhanced audio signal for any audio source (e.g., the audio source 110, the second audio source, etc.).

Figure 7:
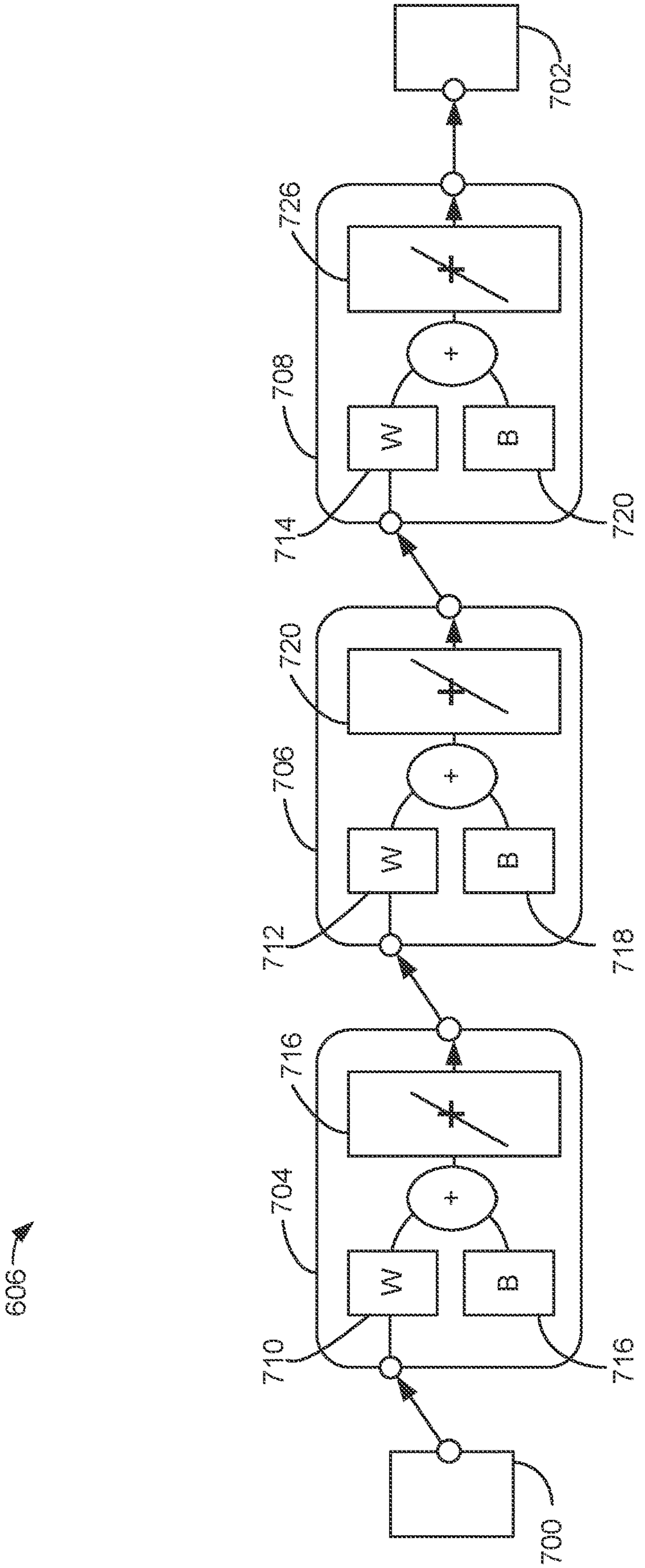
FIG. 7 is an example diagram illustrating an example neural network of the example audio collection schematic of FIG. 6.

FIG. 7 is an illustration of the example neural network 606 of the example audio collection schematic of FIG. 6. The example neural network 606 includes an input 700, an output 702, a first hidden layer 704, a second hidden layer 706, and an output layer 708. Each of the layers 704, 706, 708 includes weights 710, 712, 714 and biases 716, 718, 720. In some examples, the training phase 602 of the neural network 606 determines the weights 710, 712, 714 and the biases 716, 718, 720 based on the microphones 112, 114 and the audio signals 302, 304. However, the weights 710, 712, 714 and the biases 716, 718, 720 can be given to the neural network 606.

The example input 700 can be any number of input data values. In the example of FIG. 6, the input 700 can include the microphones 112, 114 and the signal 302, 304 from the training phase 602. Additionally or alternatively, the input 700 can include the microphone 112 and the signal 302 from the inference phase 604. In some examples, the input 700 includes the mask 502 from the mask calculation 500 and/or the training phase 602.

The first example hidden layer 704 mathematically transforms (e.g., scales, normalizes, maps, etc.) the input 700, using the determined weights 710 and biases 716, to be sent to the second hidden layer 706. The second example hidden layer 706 mathematically transforms the product from the first layer 704, using the determined weights 712 and the biases 718, to be sent to the output layer 708. The example output layer 708 mathematically transforms the product from the second layer 706, using the determined weights 714 and biases 720, to generate (e.g., calculate, determine, etc.) the output 702. In the example of FIG. 6, the output 702 can include the mask 502 from the training phase 602. Additionally or alternatively, the output 702 includes the enhanced audio signal 608 and/or the corresponding enhanced spectrum 610 from the inference phase 604. Accordingly, the neural network 606 can be utilized in the training phase 602 and/or the inference phase 604 of the process flow 600 for enhancing an audio signal.

Figure 8:
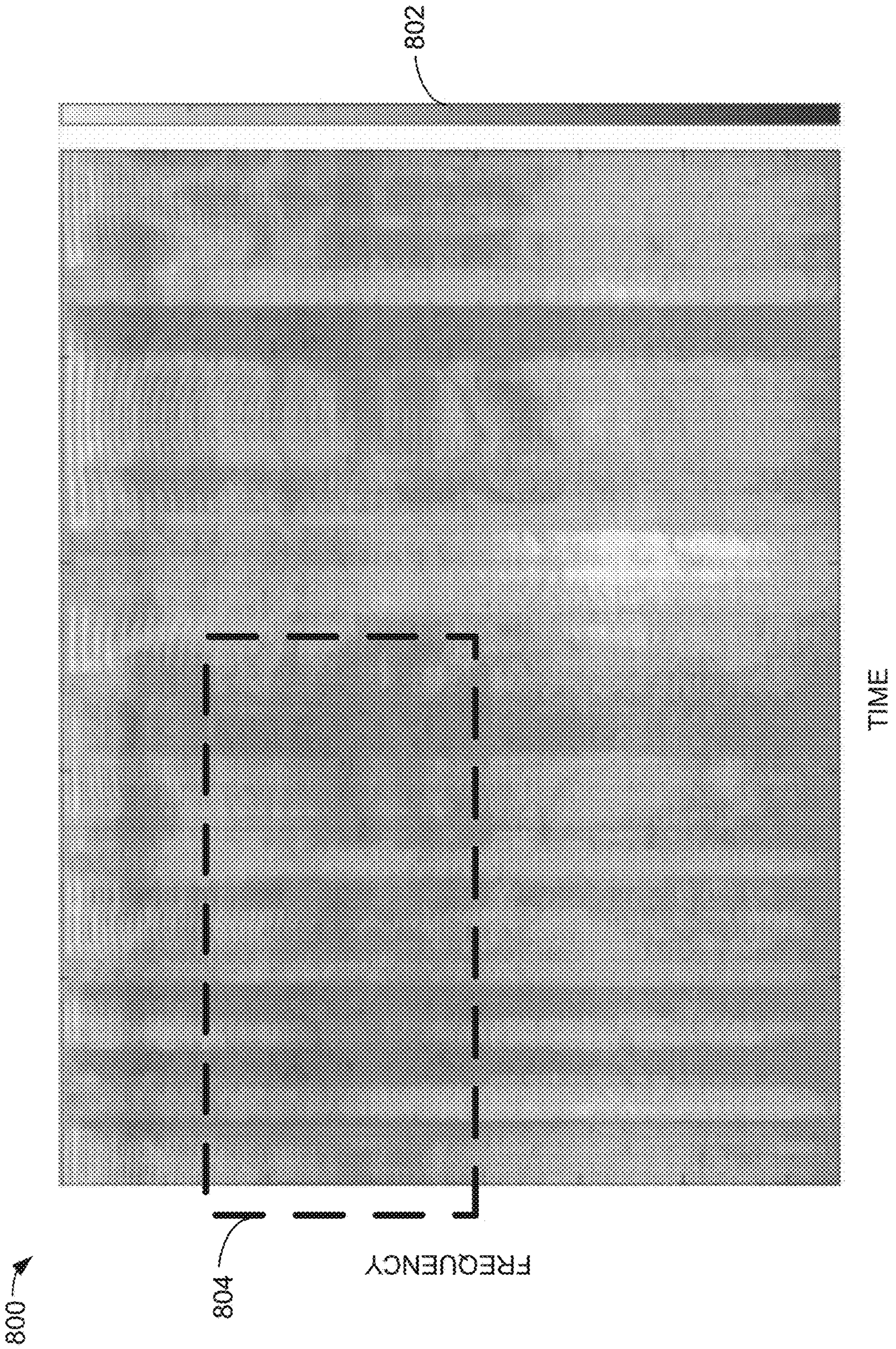
FIG. 8 illustrates an example spectrogram of an example audio signal of FIGS. 1, 3, and 6.

FIG. 8 illustrates an example spectrogram 800 of the audio signal 302 corresponding to the low quality microphone 112 of FIGS. 1, 3, and 6. The example spectrogram 800 visually represents the audio signal 302 and illustrates the frequencies as a function of time. The example spectrogram 800 includes a heat map 802 to indicate intensity and/or the presence of sound (e.g., voice, music, etc.). The frequencies present in the audio signal 302 vary with intensity. For example, the lightly shaded regions indicate the presence of sound. In the example of FIG. 8, the lighter the shade, the higher the intensity of the sound. Additionally or alternatively, the darker shaded regions indicate the absence of sound. In the example of FIG. 8, as the shade darkens, the clearer (e.g., more defined) silence. For example, region 804 of the spectrogram 800 indicates that the microphone 112 detects more of an absence of sound than a presence of sound, illustrated by the darker areas of region 804.

Figure 9:
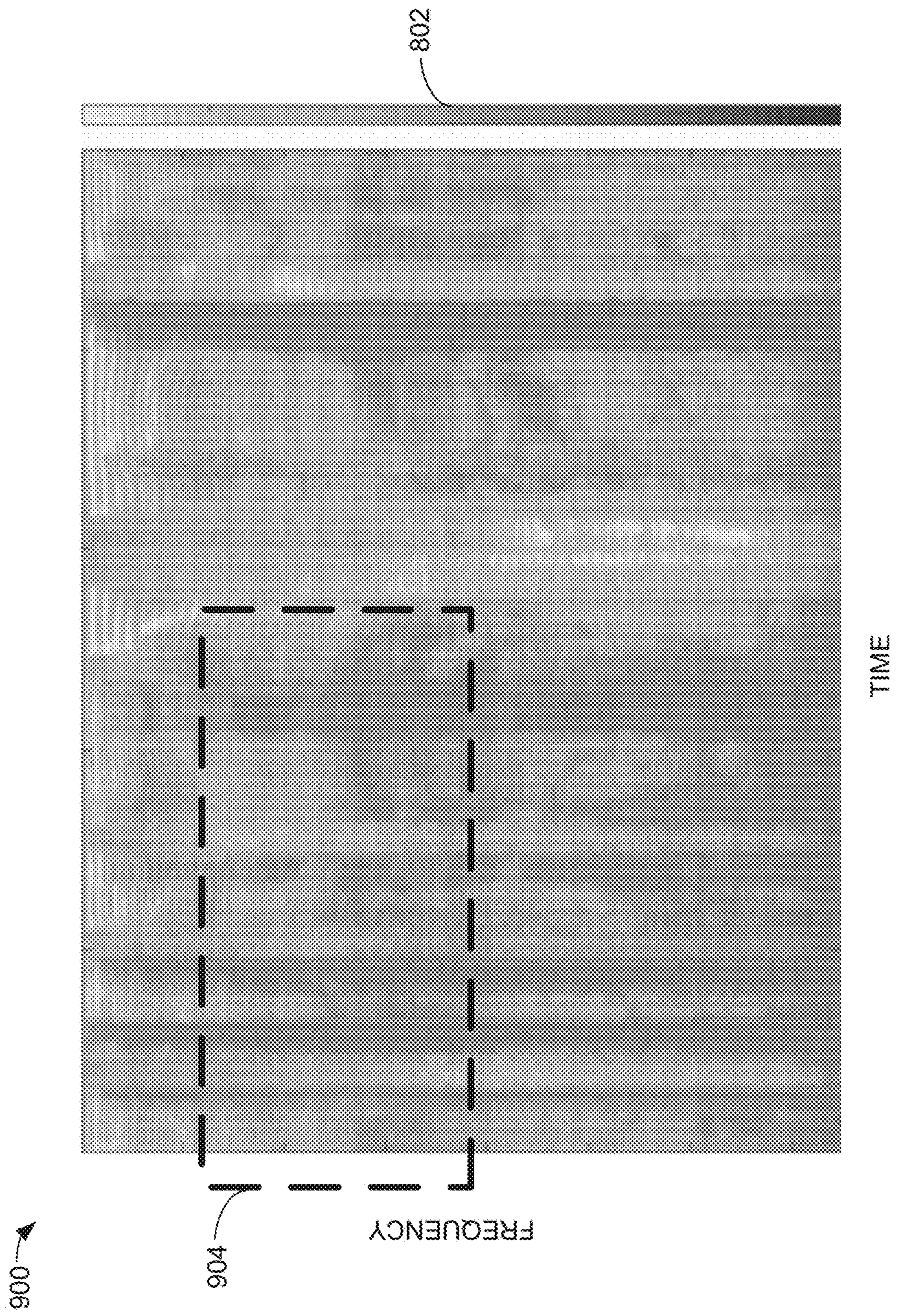
FIG. 9 illustrates another example spectrogram of another example audio signal of FIGS. 1, 3, and 6.

FIG. 9 illustrates an example spectrogram 900 of the audio signal 304 corresponding to the high quality microphone 114 of FIGS. 1, 3, and 6. The example spectrogram 900 includes region 904 and the heat map 802. The example region 904 of FIG. 9 is similar to the example region 804 of FIG. 8, but, instead, detects more of the frequencies of the sound (e.g., has a greater amount of the lightly shaded regions). Thus, the high quality spectrogram 900 detects more frequencies in the sound (e.g., the audio source 110) compared to the low quality spectrogram 800.

Figure 10:
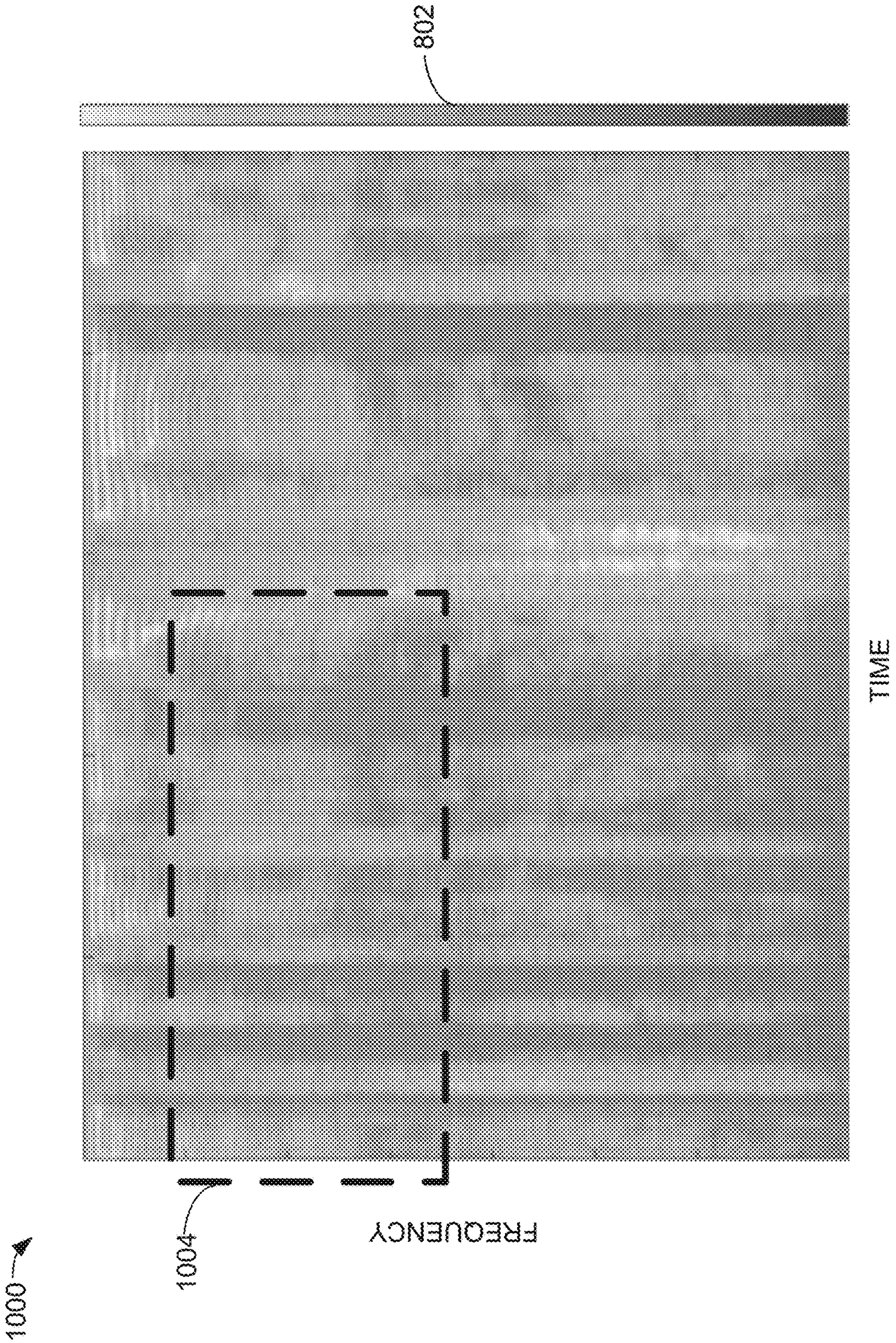
FIG. 10 illustrates yet another example spectrogram of an example audio signal of FIG. 6.

FIG. 10 illustrates an example enhanced spectrogram 1000 of the enhanced audio signal 608 corresponding to the low quality microphone 112 of FIG. 6. The example enhanced spectrogram 1000 illustrates how the mask calculation 500, the mask 502, the neural network 606, etc. can greatly improve the quality of an audio signal for a low quality microphone (e.g., the microphone 112). For example, region 1004 in the spectrogram 1000 indicates more frequencies in the sound (e.g., the audio source 110) for the microphone 112 compared to region 804 of the spectrogram 800 for the microphone 112.

Figure 11:
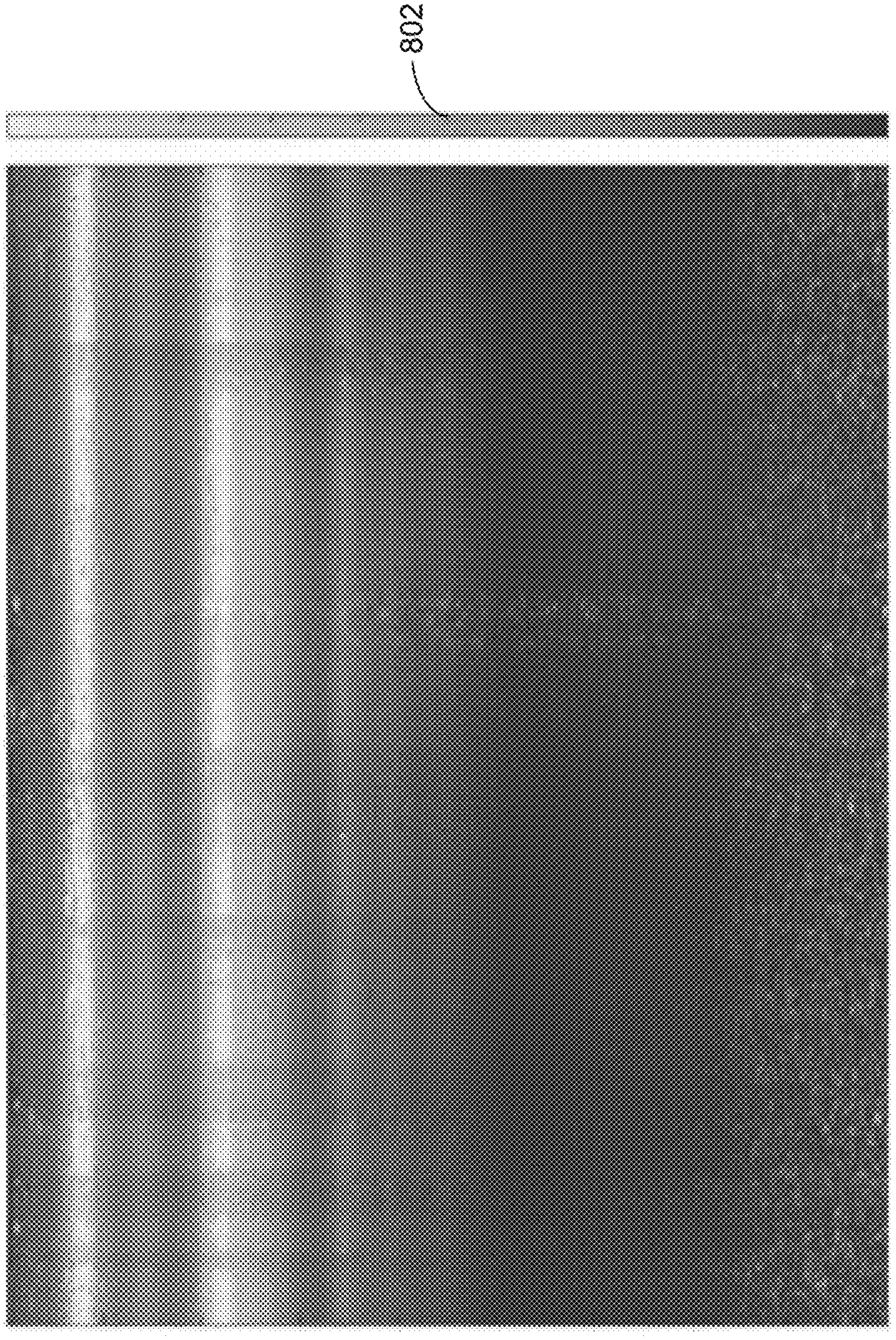
FIG. 11 illustrates an example mask spectrogram that can be implemented in examples disclosed herein.

FIG. 11 illustrates an example spectrogram 1100 of the masked audio signal corresponding to the mask 502. The example mask 502 is a ratio between the high quality spectrum 308 and the low quality spectrum 306. For example, the mask 502 is a ratio of amplitudes between the spectrums 306, 308. In FIG. 11, the shading corresponds to a linear scale of grey tonalities. For example, if the mask 502 is factor bounded from 0 to 1, the darker shaded regions represent 0 and the lighter shaded regions represent 1.

Figure 12:
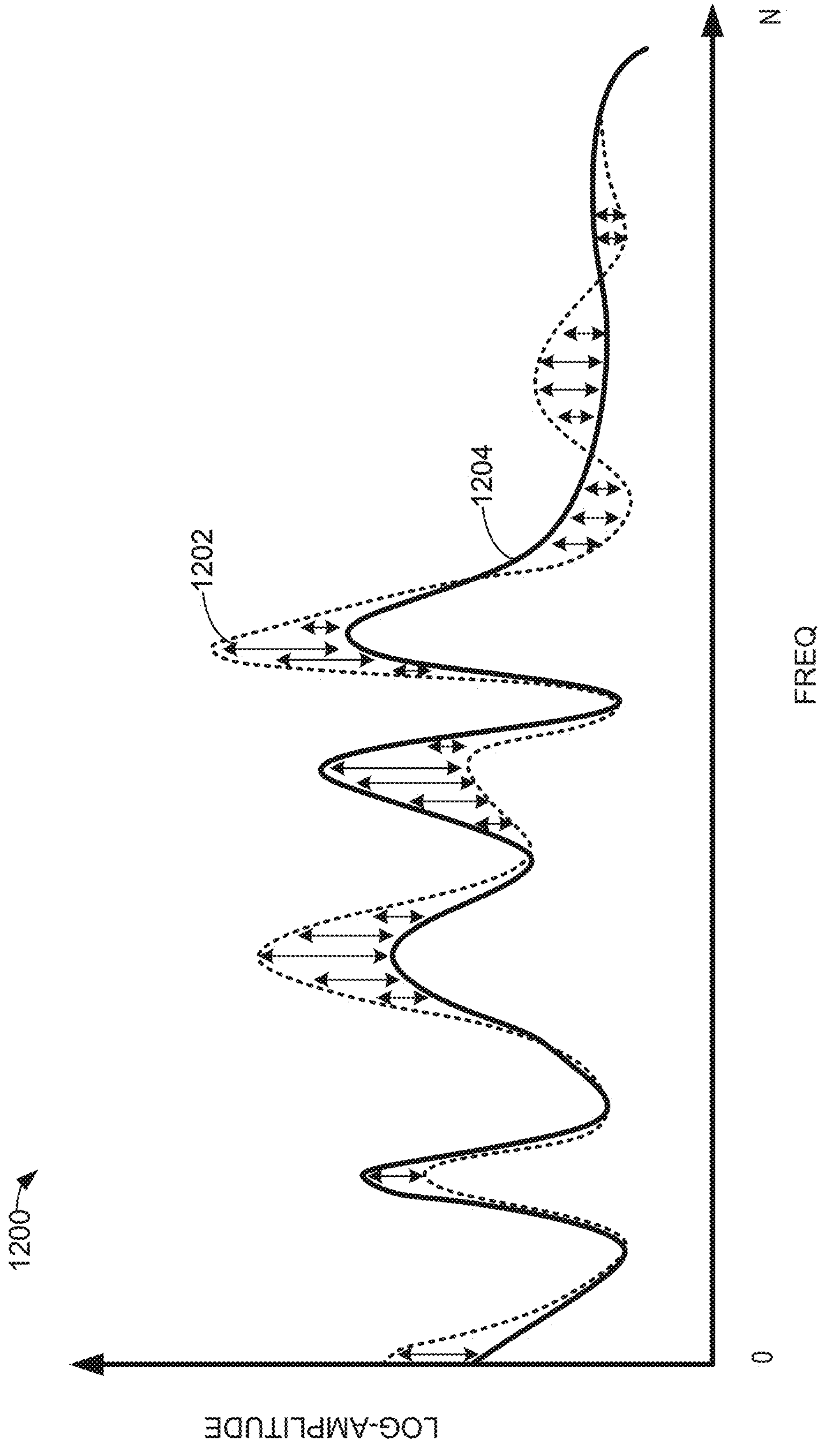
FIG. 12 illustrates an example spectral distance calculation that can be implemented in examples disclosed herein.

FIG. 12 is an example plot 1200 showing a spectral distance between two example functions. The example plot 1200 includes a first function 1202 (e.g., G(n)) and a second function 1204 (e.g., F(n)). The example functions 1202, 1204 can represent example signal spectrums (e.g., the spectrums 306, 308, 610, etc.). The example functions 1202, 1204 are described with amplitudes of a sound as a function of frequency. In the example of FIG. 12, and in the calculations below, amplitude is defined as log-amplitude.

In FIG. 12, an area between the functions 1202, 1204 can define a spectral distance between the functions 1202, 1204 (e.g., $D_{GF}$). Example equation 3, described in detail below, represents an example spectral distance calculation between the functions 1202, 1204.

$$D_{GF} = \sqrt{\frac{1}{N}\sum_{n=0}^{N}[G(n) - F(n)]^2} \qquad \text{(Equation 3)}$$

In the example equation 3 above, the spectral distance between functions 1202, 1204 ($D_{GF}$) is defined as the square root of 1 divided by N, multiplied by the summation of N points (e.g., values of frequency) from n=0 to N, and multiplied by the difference between the function 1202 at n (G(n)) and the function 1204 at n (F(n)). The spectral distance ($D_{GF}$) can quantify a distance (e.g., differences, overlap, etc.) between the functions 1202, 1204. Additionally or alternatively, the spectral distance ($D_{GF}$) defines (e.g., outputs) a quantity for similarity (e.g., overlap) between function 1202 and function 1204.

Example equation 4, described in detail below, represents an example spectral distance calculation between the low quality spectrum 306 and the high quality spectrum 308.

$$D_{HL} = \sqrt{\frac{1}{N}\sum_{n=0}^{N}[H(n) - L(n)]^2} \quad \text{(Equation 4)}$$

In example equation 4 above, the spectral distance between the spectrums 306, 308 ($D_{HL}$) is determined using the spectrum 308 (H(n)) and the spectrum 306 (L(n)).

Example equation 5, described in detail below, represents an example spectral distance calculation between the enhanced signal spectrum 610 and the high quality signal spectrum 308.

$$D_{HE} = \sqrt{\frac{1}{N}\sum_{n=0}^{N}[H(n) - E(n)]^2} \quad \text{(Equation 5)}$$

In example equation 5 above, the spectral distance between the spectrums 308, 610 ($D_{HE}$) is determined using the spectrum 308 (H(n)) and the spectrum 610 (E(n)).

The example enhanced signal spectrum 610 represents an improved quality of an audio signal captured from the microphone 112. As such, the enhanced spectrum 610 will be similar to the high quality spectrum 308. However, this similarity can be quantified with equation 5. For example, the spectral distance ($D_{HE}$) can equal 3 decibels (dB). In some examples, a spectral distance of 4 dB indicates high similarity between two spectrums. However, a spectral distance of 6 dB can indicate high similarity between two spectrums. Thus, the spectrums 610, 308 can be characterized as similar.

The low quality spectrum 306 and the high quality spectrum 308 of FIGS. 1, 3, and 6 output different values for amplitude and frequency. However, this dissimilarity (e.g., differences) can be quantified with equation 4. For example, the spectral distance ($D_{HL}$) can equal 15 decibels (dB). In some examples, a spectral distance greater than 6 dB indicates high dissimilarity between two spectrums. Thus, the spectrums 306, 308 can be characterized as dissimilar.

In some examples, comparing spectral distances can indicate if an enhanced spectrum achieves a higher quality spectrum than a low quality spectrum. For example, comparing ($D_{HL}$)=10 dB and ($D_{HE}$)=3 dB demonstrates that ($D_{HE}$)<($D_{HL}$). Accordingly, ($D_{HE}$)<($D_{HL}$) indicates that the enhanced spectrum 610 is a higher quality compared to the low quality spectrum 306.

Figure 13:
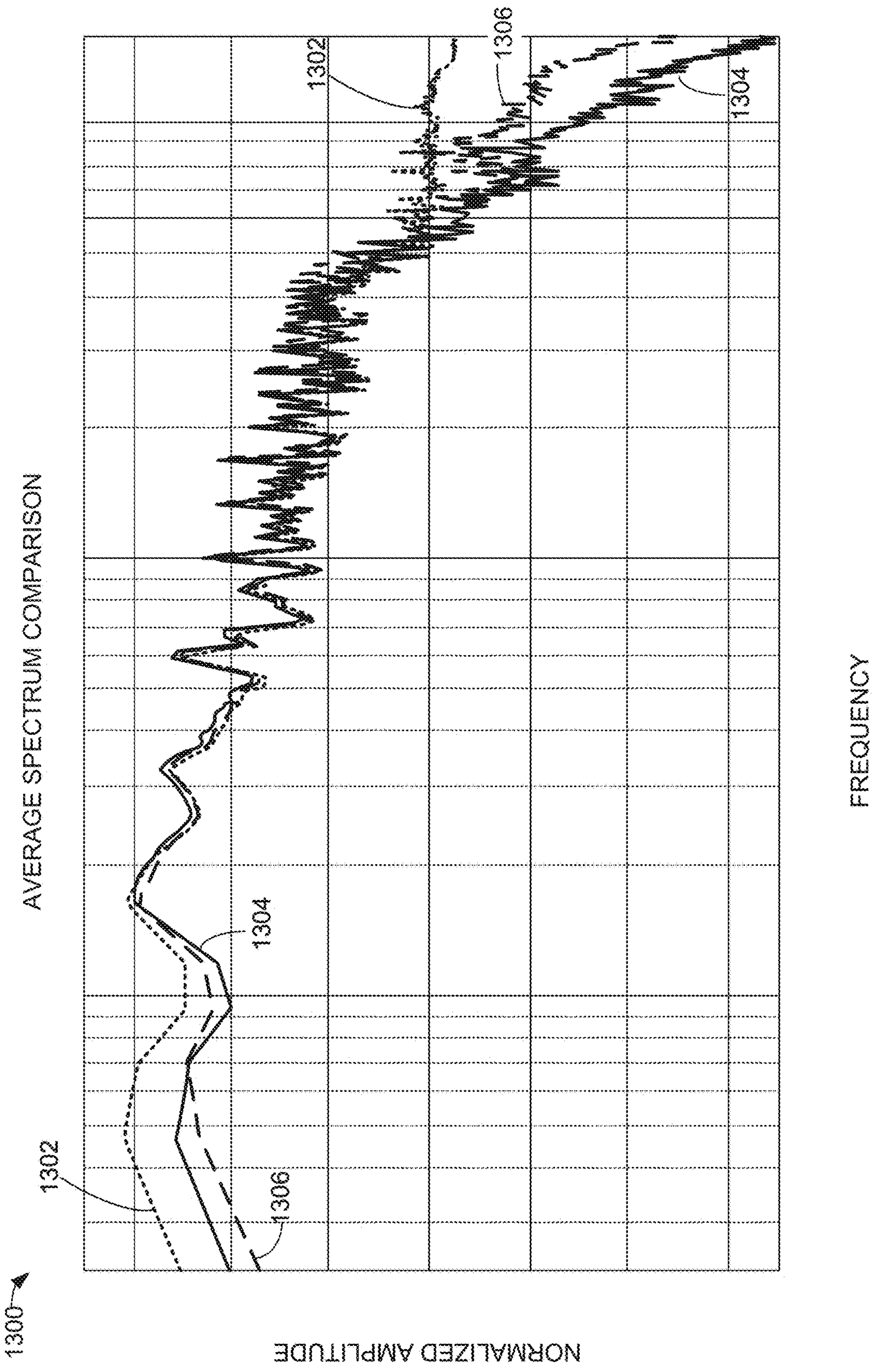
FIG. 13 is a graphical illustration showing amplitude as a function of frequency for the example audio signals of FIG. 6.

FIG. 13 is a graphical illustration showing amplitude as a function of frequency for the signal spectrums 306, 308, 610 for the microphones 112, 114. In example plot 1300 of FIG. 13, the signal spectrums 306, 308, 610 are illustrated in terms of averaged spectrum. The low quality spectrum 306 corresponds to plot 1302. The high quality spectrum 308 corresponds to plot 1304. The enhanced spectrum 610 corresponds to plot 1306.

The enhanced spectrum 610 detects more of the sound (e.g., amplitudes of the sound, frequencies of the sound, etc.) of the high quality spectrum 308 compared to the low quality spectrum 306. Thus, the enhanced spectrum 610 is a higher quality signal than the low quality signal spectrum 306 for the microphone 112. In FIG. 13 the plot 1306 follows (e.g., tracks) the plot 1304.

While an example manner of implementing the spectrum enhancer circuitry 116 of FIG. 1 is illustrated in FIG. 2, one or more of the elements, processes, and/or devices illustrated in FIG. 2 may be combined, divided, re-arranged, omitted, eliminated, and/or implemented in any other way. Further, the example signal determination circuitry 200, the example mask calculator circuitry 202, the spectrum generator circuitry 204 and/or, more generally, the example spectrum enhancer circuitry 116 of FIGS. 1 and 2, may be implemented by hardware alone or by hardware in combination with software and/or firmware. Thus, for example, any of the example signal determination circuitry 200, the example mask calculator circuitry 202, the spectrum generator circuitry 2, and/or, more generally, the example spectrum enhancer circuitry 116, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example spectrum enhancer circuitry 116 of FIG. 1 may include one or more elements, processes, and/or devices in addition to, or instead of, those illustrated in FIG. 2, and/or may include more than one of any or all of the illustrated elements, processes and devices.

Figure 14:
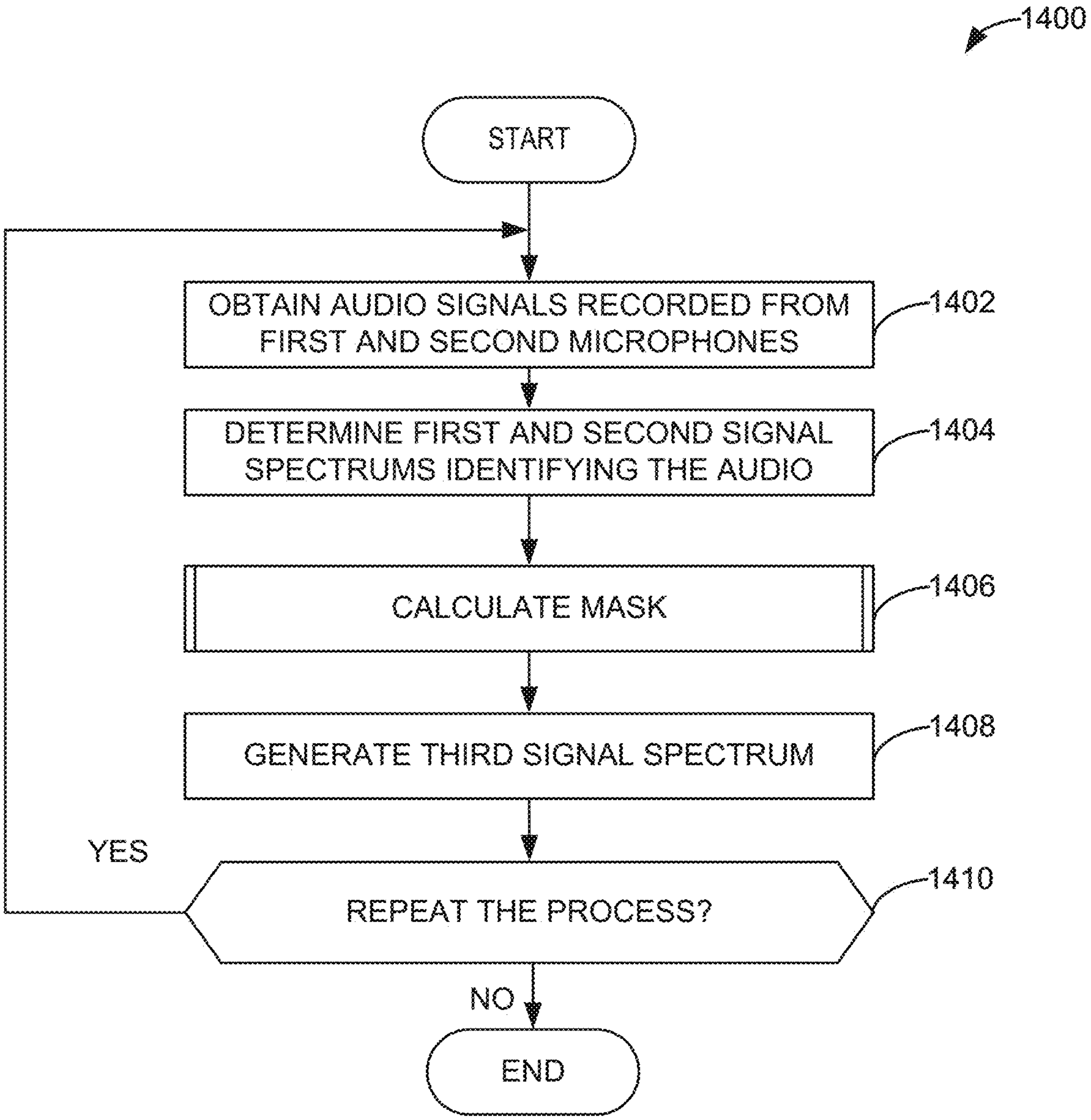
FIG. 14 is a flowchart representative of example machine readable instructions and/or example operations that may be executed by example processor circuitry to implement the example spectrum enhancer circuitry of FIGS. 1 and 2.
Figure 15:
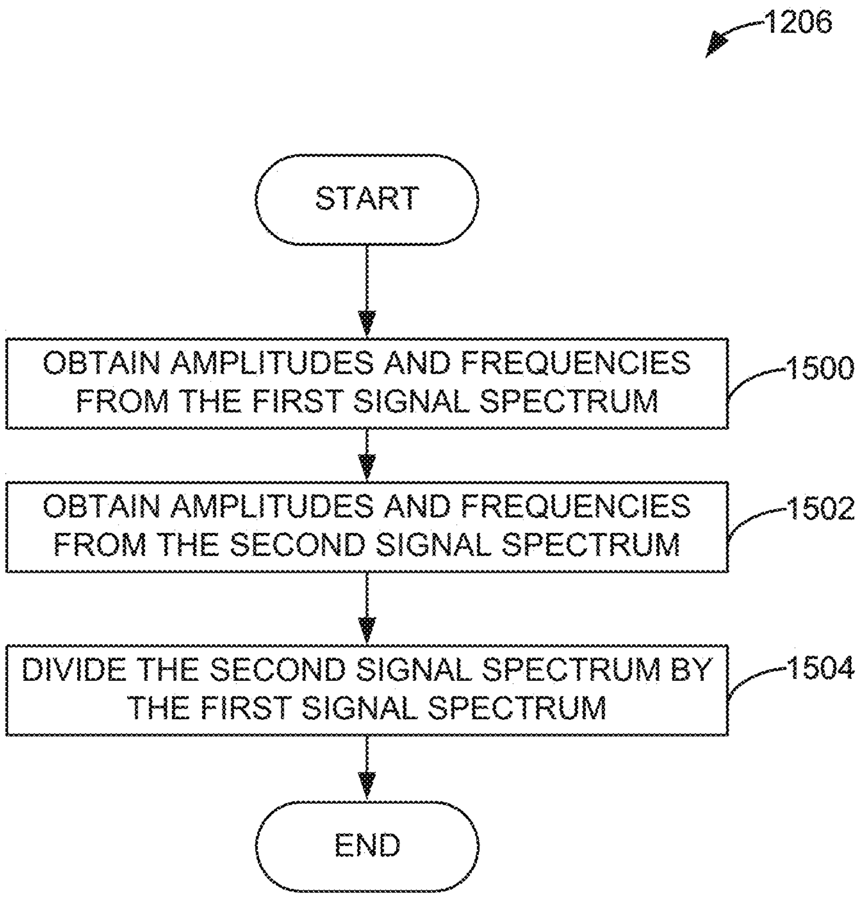
FIG. 15 is a flowchart representative of example machine readable instructions and/or example operations that may be executed by example processor circuitry to implement the example spectrum enhancer circuitry of FIGS. 1 and 2.

Flowcharts representative of example hardware logic circuitry, machine readable instructions, hardware implemented state machines, and/or any combination thereof for implementing the spectrum enhancer circuitry 116 of FIG. 2 is shown in FIGS. 14 and 15. The machine readable instructions may be one or more executable programs or portion(s) of an executable program for execution by processor circuitry, such as the processor circuitry 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 14 and 15, many other methods of implementing the example spectrum enhancer circuitry 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 14 and 15 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 14 is a flowchart representative of example machine readable instructions and/or example operations 1400 that may be executed and/or instantiated by processor circuitry to enhance an audio signal. The machine readable instructions and/or the operations 1400 of FIG. 14 begin at block 1402, at which the signal determination circuitry 200 obtains audio signals that have been recorded by first and second microphones. For example, the signal determination circuitry 200 can obtain the audio signal 302 for the first microphone 112 and the audio signal 304 for the second microphone 114. In some examples, the signal determination circuitry 200 obtains the audio signals 302, 304 from the microphones 112, 114 when the microphones 112, 114 have recorded audio from the audio source 110. In some examples, the signal determination circuitry 200 determines (e.g., calculates) the audio signals 302, 304 to identify the audio the from audio source 110.

At block 1404, the signal determination circuitry 200 determines (e.g., calculates, generates, etc.) first and second signal spectrums identifying the audio. For example, the signal determination circuitry 200 utilizes the Fourier Transform to convert the audio signals 302, 304 corresponding to each of the microphones 112, 114 into signal spectrums 306, 608, such that the audio signals 302, 304 are described in the frequency domain. In some examples, the signal determination circuitry 200 calculates the signal spectrums 306, 308 such that the spectrums 306, 308 include amplitudes and frequencies corresponding to (e.g., describing) the audio source 110. In some examples, the signal determination circuitry 200 can determine the spectrums 306, 308 corresponding to each of the microphones 112, 114, such that the spectrum 308 has a spectral distance (e.g., $D_{HL}$) to the spectrum 306. For example, the signal determination circuitry 200 can utilize the spectral distance calculation described in FIG. 12 and equations 1-5. In some examples, the signal determination circuitry 200 determines spectrums with varying dynamic ranges and/or bandwidth (e.g., sound qualities, audio qualities, recording quality, etc.).

At block 1406, the example mask calculator circuitry 202 calculates a mask (e.g., the mask 502), further described in conjunction with FIG. 15. In some examples, the mask calculator circuitry 202 calculates the mask 502 (e.g., audio mask, spectral mask, etc.) based on the signal spectrums 306, 308 corresponding to each of the microphones 112, 114. For example, the mask calculator circuitry 202 utilizes the amplitudes and frequencies recorded between signal spectrums 306, 308 to calculate the mask 502 (e.g., ratio between amplitudes of the spectrums, ratio between frequencies of the spectrums, etc.).

At block 1408, the example spectrum generator circuitry 204 generates a third signal spectrum. In some examples, the spectrum generator circuitry 204 generates the enhanced signal spectrum 610 and/or the enhanced audio signal 608 corresponding to the first microphone 112. In some examples, the spectrum generator circuitry 204 can utilize the mask 502 (e.g., audio mask, spectral mask, etc.) to generate the signal spectrum 610. For example, the spectrum generator circuitry 204 can generate the enhanced signal spectrum 610 corresponding to the low quality microphone 112 (e.g., the low quality microphone) utilizing the mask 502 calculated between the signal spectrums 306, 308. In some examples, the spectrum generator circuitry 204 can utilize example equation 2 to generate the enhanced signal spectrum 610. However, the spectrum generator circuitry 204 can utilize the neural network 606 and/or the mask 502 to generate the enhanced spectrum 610. In some examples, the spectrum generator circuitry 204 can generate enhanced spectrum 610 for the microphone 112 such that the enhanced signal spectrum 610 is a higher quality spectrum and/or audio signal for the microphone 112. In some examples, the spectrum generator circuitry 204 can convert the enhanced audio signal 608 to the enhanced signal spectrum 610 via an Inverse Fourier Transform. In some examples, the spectrum generator circuitry 204 generates a signal spectrum corresponding to the microphone 112 utilizing the mask 502 for a second audio source different from the audio source 110. For example, the spectrum generator circuitry 204 can utilize the mask 502 to generate enhanced audio signals for different audio sources and/or different audio content corresponding to the first microphone 112.

At block 1410 it is determined whether to repeat the process. If the process is to be repeated (block 1410), control of the process returns to block 1402. Otherwise the process ends.

FIG. 15 is a flowchart representative of example machine readable instructions and/or example operations that may be executed and/or instantiated by processor circuitry to implement the spectrum enhancer circuitry 116, as described above in conjunction with block 1406 of FIG. 14. The machine readable instructions and/or operations of FIG. 15 begin at block 1500, at which the example mask calculator circuitry 202 obtains amplitude and frequency data from the first signal spectrum. In some examples, the mask calculator circuitry 202 obtains amplitude (e.g., the amplitude B and/or the amplitude E) and frequency (e.g., the frequency A) data from the low quality spectrum 306 corresponding the first microphone 112.

At block 1502, the example mask calculator circuitry 202 obtains amplitude and frequency data from the second signal spectrum. In some examples, the mask calculator circuitry 202 obtains amplitude (e.g., the amplitude C and/or the amplitude F) and frequency (e.g., the frequency D) data from the high quality spectrum 308 corresponding the second microphone 114.

At block 1504, the example mask calculator circuitry 202 divides the second signal spectrum by the first signal spectrum. In some examples, the mask calculator circuitry 202 divides the spectrum 308 by the spectrum 306. In some examples, the mask calculator circuitry 202 utilizes equation 1 to calculate the mask 502. In some examples, the mask calculator circuitry 202 divides amplitude C by amplitude B to determine the mask 502 at frequency A (e.g., point 504). In some examples, the mask calculator circuitry 202 divides the amplitude F by the amplitude E to determine the mask 502 at frequency D (e.g., point 506). Then, the process ends.

Figure 16:
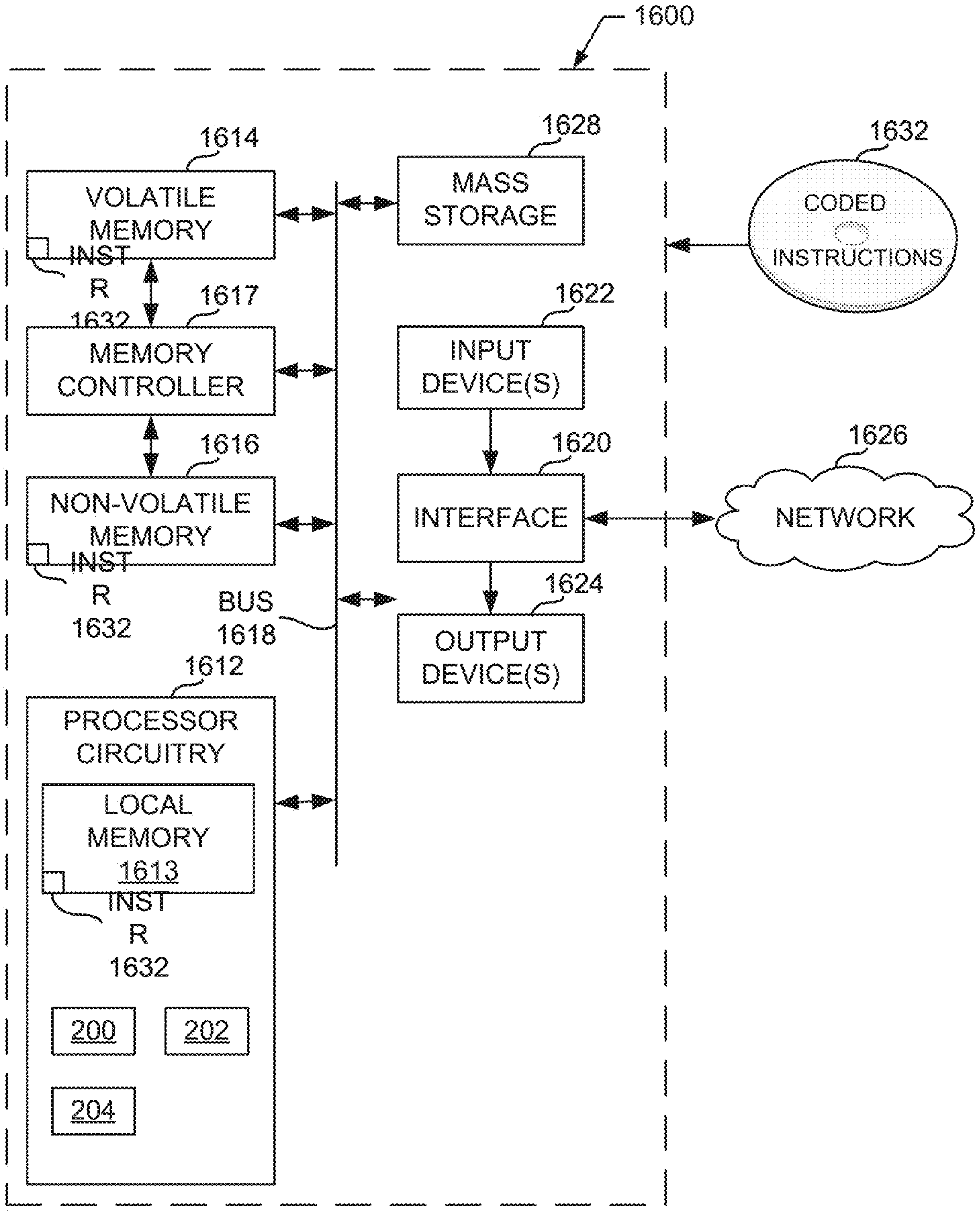
FIG. 16 is a block diagram of an example processing platform including processor circuitry structured to execute the example machine readable instructions and/or the example operations of FIGS. 14 and 15 to implement the example spectrum enhancer circuitry of FIGS. 1 and 2.

FIG. 16 is a block diagram of an example processor platform 1600 structured to execute and/or instantiate the machine readable instructions and/or the operations of FIGS. 14 and 15 to implement the spectrum enhancer circuitry 116 of FIGS. 1 and 2. The processor platform 1600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs, microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements the signal determiner circuitry 200, the mask calculator circuitry 202, the spectrum generator circuitry 204, and the spectrum enhancer circuitry 116.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1632, which may be implemented by the machine readable instructions of FIGS. 14 and 15 may be stored in the mass storage device 1628, in the volatile memory 1614, in the non-volatile memory 1616, and/or on a removable non-transitory computer readable storage medium such as a CD or DVD.

Figure 17:
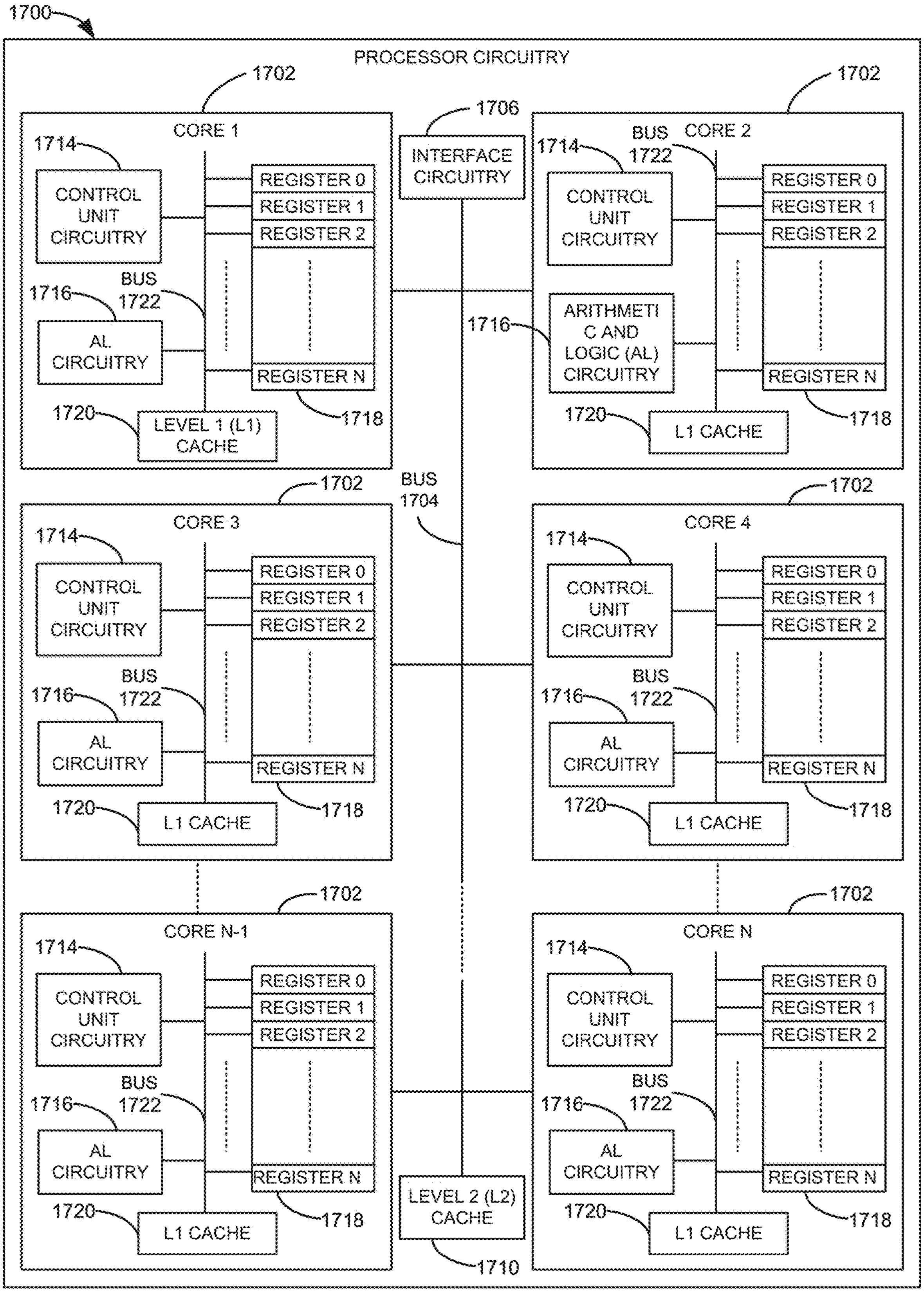
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a general purpose microprocessor 1700. The general purpose microprocessor circuitry 1700 executes some or all of the machine readable instructions of the flowcharts of FIGS. 14 and 15 to effectively instantiate the circuitry of FIG. 2 as logic circuits to perform the operations corresponding to those machine readable instructions. In some such examples, the circuitry of FIG. 2 is instantiated by the hardware circuits of the microprocessor 1700 in combination with the instructions. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowcharts of FIGS. 14 and 15.

The cores 1702 may communicate by a first example bus 1704. In some examples, the first bus 1704 may implement a communication bus to effectuate communication associated with one(s) of the cores 1702. For example, the first bus 1704 may implement at least one of an Inter-Integrated Circuit (I2C) bus, a Serial Peripheral Interface (SPI) bus, a PCI bus, or a PCIe bus. Additionally or alternatively, the first bus 1704 may implement any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the L1 cache 1720, and a second example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The second bus 1722 may implement at least one of an I2C bus, a SPI bus, a PCI bus, or a PCIe bus.

Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
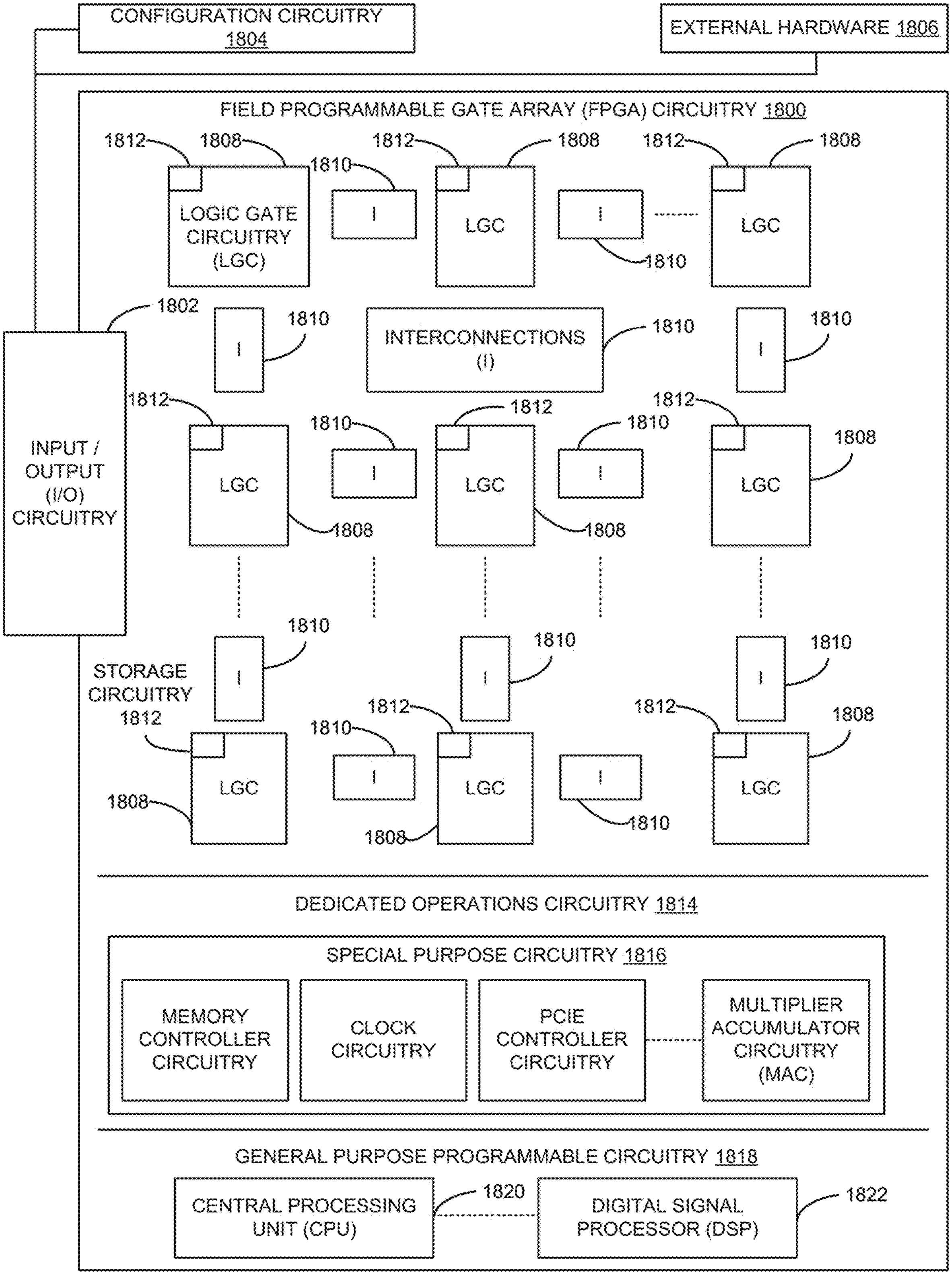
FIG. 18 is a block diagram of another example implementation of the processor circuitry of FIG. 16.
Figure 19:
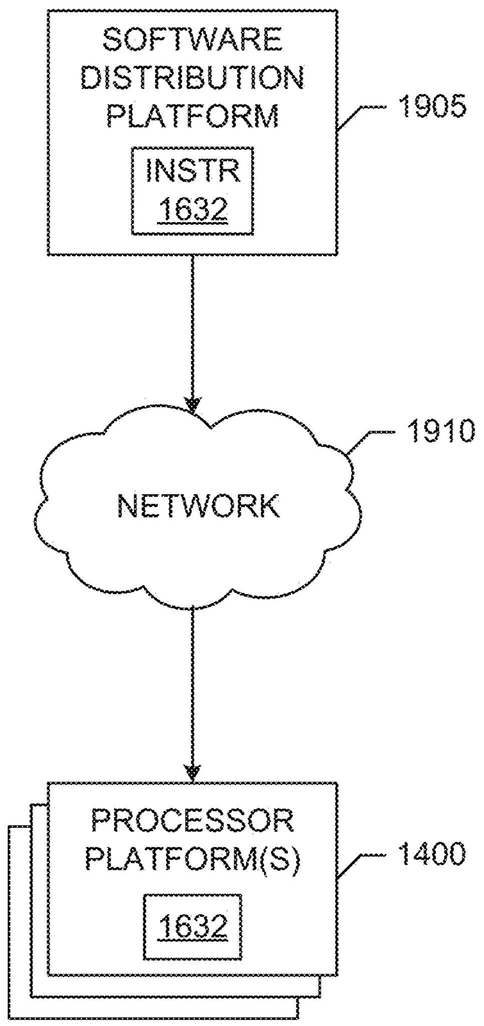
FIG. 19 is a block diagram of an example software distribution platform (e.g., one or more servers) to distribute software (e.g., software corresponding to the example machine readable instructions of FIGS. 13 and 14) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 18 is a block diagram of another example implementation of the processor circuitry 1612 of FIG. 16. In this example, the processor circuitry 1612 is implemented by FPGA circuitry 1800. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 7 described above (which is a general purpose device that may be programmed to execute some or all of the machine readable instructions represented by the flowcharts of FIGS. 14 and 15 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowcharts of FIGS. 14 and 15. In particular, the FPGA 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 14 and 15. As such, the FPGA circuitry 1800 may be structured to effectively instantiate some or all of the machine readable instructions of the flowcharts of FIGS. 14 and 15 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIGS. 14 and 15 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 1806 may implement the microprocessor 1700 of FIG. 7. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine readable instructions of FIGS. 14 and 15 and/or other desired operations. The logic gate circuitry 1808 shown in FIG. 18 is fabricated in groups or blocks.

Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1612 of FIG. 16 may additionally be implemented by combining the example microprocessor 1700 of FIG. 7 and the example FPGA circuitry 1800 of FIG. 18. In some such hybrid examples, a first portion of the machine readable instructions represented by the flowcharts of FIGS. 14 and 15 may be executed by one or more of the cores 1702 of FIG. 17, a second portion of the machine readable instructions represented by the flowcharts of FIGS. 14 and 15 may be executed by the FPGA circuitry 1800 of FIG. 18, and/or a third portion of the machine readable instructions represented by the flowcharts of FIGS. 14 and 15 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1612 of FIG. 16 may be in one or more packages. For example, the processor circuitry 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

A block diagram illustrating an example software distribution platform 1905 to distribute software such as the example machine readable instructions 1632 of FIG. 16 to hardware devices owned and/or operated by third parties is illustrated in FIG. 16. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1632, which may correspond to the example machine readable instructions of FIGS. 14 and 15, as described above. The one or more servers of the example software distribution platform 1905 are in communication with a network 1910, which may correspond to any one or more of the Internet and/or any of the example networks 1626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1632 from the software distribution platform 1905. For example, the software, which may correspond to the example machine readable instructions of FIGS. 14 and 15, may be downloaded to the example processor platform 1600, which is to execute the machine readable instructions 1632 to implement the spectrum enhancer circuitry 116. In some example, one or more servers of the software distribution platform 1905 periodically offer, transmit, and/or force updates to the software (e.g., the example machine readable instructions 1632 of FIG. 16) to ensure improvements, patches, updates, etc., are distributed and applied to the software at the end user devices.

From the foregoing, it will be appreciated that example systems, methods, apparatus, and articles of manufacture have been disclosed that enhance the audio signal of a low quality microphone. Examples disclosed herein enable high quality sound (e.g., high quality audio signals, high bandwidth, high dynamic range, improved frequency response, etc.) for devices with low cost/low quality microphones. Examples disclosed herein allow a deep learning system to estimate missing information (e.g., bandwidth, range, etc.) for a low cost microphone output to be similar to a high cost microphone output. Examples disclosed herein allow for high quality audio signals using inexpensive equipment. Disclosed systems, methods, apparatus, and articles of manufacture improve the efficiency of using a computing device by enabling use of a low quality microphone to output a high quality audio signal. Disclosed systems, methods, apparatus, and articles of manufacture are accordingly directed to one or more improvement(s) in the operation of a machine such as a computer or other electronic and/or mechanical device.

Example 1 includes an apparatus for enhancing an audio signal, the apparatus comprising at least one memory, instructions, and processor circuitry to execute the instructions to at least determine a first signal spectrum corresponding to a first microphone, the first signal spectrum identifying first audio from a first audio source, determine a second signal spectrum corresponding to a second microphone, the second signal spectrum identifying the first audio, the second signal spectrum different from the first signal spectrum, the first microphone different from the second microphone, the second signal spectrum having a first spectral distance to the first signal spectrum, calculate a mask based on the first and second signal spectrums, and generate a third signal spectrum corresponding to the first microphone utilizing the mask and the first signal spectrum, the third signal spectrum different from the first signal spectrum, the third signal spectrum having a second spectral distance to the second signal spectrum, the second spectral distance less than the first spectral distance.

Example 2 includes the apparatus of example 1, wherein the processor circuitry is to at least generate a fourth signal spectrum corresponding to the first microphone utilizing the mask, the fourth signal spectrum identifying second audio from a second audio source, the second audio different from the first audio, the second audio source different from the first audio source.

Example 3 includes the apparatus of example 1, wherein the second spectral distance is in a range from 4 decibels (dB) to 6 dB.

Example 4 includes the apparatus of example 1, wherein the processor circuitry is to at least obtain a first audio signal from the first microphone, the first signal spectrum generated from the first audio signal via a Fourier transform, the first signal spectrum including amplitudes and frequencies corresponding to the first audio.

Example 5 includes the apparatus of example 1, wherein the processor circuitry is to at least obtain a second audio signal from the second microphone, the second signal spectrum generated from the second audio signal via a Fourier transform, the second signal spectrum including amplitudes and frequencies corresponding to the first audio.

Example 6 includes the apparatus of example 1, wherein the third signal spectrum is an enhanced signal spectrum corresponding to the first microphone.

Example 7 includes the apparatus of example 1, wherein the mask is a ratio between the second signal spectrum and the first signal spectrum.

Example 8 includes the apparatus of example 7, wherein the ratio is a factor, the factor bounded from 0 to 1.

Example 9 includes the apparatus of example 8, wherein the processor circuitry is to multiply the first signal spectrum by the factor to generate the third signal spectrum.

Example 10 includes the apparatus of example 1, wherein the first signal spectrum has a first bandwidth and the second signal spectrum has a second bandwidth, the second bandwidth greater than the first bandwidth.

Example 11 includes the apparatus of example 1, wherein the first signal spectrum has a first dynamic range and the second signal spectrum has a second dynamic range, the second dynamic range greater than the first dynamic range.

Example 12 includes the apparatus of example 1, wherein the third signal spectrum is generated via a neural network, the neural network utilizing the mask.

Example 13 includes at least one non-transitory computer readable medium comprising computer readable instructions that, when executed, cause at least one processor to at least determine a first signal spectrum corresponding to a first microphone, the first signal spectrum identifying first audio from a first audio source, determine a second signal spectrum corresponding to a second microphone, the second signal spectrum identifying the first audio, the second signal spectrum different from the first signal spectrum, the first microphone different from the second microphone, the second signal spectrum having a first spectral distance to the first signal spectrum, calculate a mask based on the first and second signal spectrums, and generate a third signal spectrum corresponding to the first microphone utilizing the mask, the third signal spectrum different from the first signal spectrum, the third signal spectrum having a second spectral distance to the second signal spectrum, the second spectral distance less than the first spectral distance.

Example 14 includes the at least one non-transitory computer readable medium of example 13, wherein the instructions cause the at least one processor to generate a fourth signal spectrum corresponding to the first microphone utilizing the mask, the fourth signal spectrum identifying second audio from a second audio source, the second audio different from the first audio, the second audio source different from the first audio source.

Example 15 includes the at least one non-transitory computer readable medium of example 13, wherein the second spectral distance is in a range from 4 decibels (dB) to 6 dB.

Example 16 includes the at least one non-transitory computer readable medium of example 13, wherein the instructions cause the at least one processor to obtain a first audio signal from the first microphone, the first signal spectrum generated from the first audio signal via a Fourier transform, the first signal spectrum including amplitudes and frequencies corresponding to the first audio.

Example 17 includes the at least one non-transitory computer readable medium of example 13, wherein the instructions cause the at least one processor to obtain a second audio signal from the second microphone, the second signal spectrum generated from the second audio signal via a Fourier transform, the second signal spectrum including amplitudes and frequencies corresponding to the first audio.

Example 18 includes the at least one non-transitory computer readable medium of example 13, wherein the third signal spectrum is an enhanced signal spectrum corresponding to the first microphone.

Example 19 includes the at least one non-transitory computer readable medium of example 13, wherein the mask is a ratio between the second signal spectrum and the first signal spectrum.

Example 20 includes the at least one non-transitory computer readable medium of example 19, wherein the ratio is a factor, the factor bounded from 0 to 1.

Example 21 includes the at least one non-transitory computer readable medium of example 20, wherein the instructions cause the at least one processor to multiply the first signal spectrum by the factor to generate the third signal spectrum.

Example 22 includes the at least one non-transitory computer readable medium of example 13, wherein the first signal spectrum has a first bandwidth and the second signal spectrum has a second bandwidth, the second bandwidth greater than the first bandwidth.

Example 23 includes the at least one non-transitory computer readable medium of example 13, wherein the first signal spectrum has a first dynamic range and the second signal spectrum has a second dynamic range, the second dynamic range greater than the first dynamic range.

Example 24 includes the at least one non-transitory computer readable medium of example 13, wherein the third signal spectrum is generated via a neural network, the neural network utilizing the mask.

Example 25 includes a method comprising determining a first signal spectrum corresponding to a first microphone, the first signal spectrum identifying first audio from a first audio source, determining a second signal spectrum corresponding to a second microphone, the second signal spectrum identifying the first audio, the second signal spectrum different from the first signal spectrum, the first microphone different from the second microphone, the second signal spectrum having a first spectral distance to the first signal spectrum, calculating a mask based on the first and second signal spectrums, and generating a third signal spectrum corresponding to the first microphone utilizing the mask, the third signal spectrum different from the first signal spectrum, the third signal spectrum having a second spectral distance to the second signal spectrum, the second spectral distance less than the first spectral distance.

Example 26 includes the method of example 25, further including generating a fourth signal spectrum corresponding to the first microphone utilizing the mask, the fourth signal spectrum identifying second audio from a second audio source, the second audio different from the first audio, the second audio source different from the first audio source.

Example 27 includes the method of example 25, wherein the second spectral distance is in a range from 4 decibels (dB) to 6 dB.

Example 28 includes the method of example 25, further including obtaining a first audio signal from the first microphone, the first signal spectrum generated from the first audio signal via a Fourier transform, the first signal spectrum including amplitudes and frequencies corresponding to the first audio.

Example 29 includes the method of example 25, further including obtaining a second audio signal from the second microphone, the second signal spectrum generated from the second audio signal via a Fourier transform, the second signal spectrum including amplitudes and frequencies corresponding to the first audio.

Example 30 includes the method of example 25, wherein the third signal spectrum is an enhanced signal spectrum corresponding to the first microphone.

Example 31 includes the method of example 25, wherein the mask is a ratio between the second signal spectrum and the first signal spectrum.

Example 32 includes the method of example 31, wherein the ratio is a factor, the factor bounded from 0 to 1.

Example 33 includes the method of example 32, further including multiplying the first signal spectrum by the factor to generate the third signal spectrum.

Example 34 includes the method of example 25, wherein the first signal spectrum has a first bandwidth and the second signal spectrum has a second bandwidth, the second bandwidth greater than the first bandwidth.

Example 35 includes the method of example 25, wherein the first signal spectrum has a first dynamic range and the second signal spectrum has a second dynamic range, the second dynamic range greater than the first dynamic range.

Example 36 includes the method of example 25, wherein the generating the third signal spectrum further includes generating the third signal spectrum via a neural network, the neural network utilizing the mask.

Example 37 includes an apparatus comprising means for determining to determine a first signal spectrum corresponding to a first microphone, the first signal spectrum identifying first audio from a first audio source, determine a second signal spectrum corresponding to a second microphone, the second signal spectrum identifying the first audio, the second signal spectrum different from the first signal spectrum, the first microphone different from the second microphone, the second signal spectrum having a first spectral distance to the first signal spectrum, means for calculating to calculate a mask based on the first and second signal spectrums, and means for generating to generate a third signal spectrum corresponding to the first microphone utilizing the mask, the third signal spectrum different from the first signal spectrum, the third signal spectrum having a second spectral distance to the second signal spectrum, the second spectral distance less than the first spectral distance.

Example 38 includes the apparatus of example 37, wherein the means for generating is to generate a fourth signal spectrum corresponding to the first microphone utilizing the mask, the fourth signal spectrum identifying second audio from a second audio source, the second audio different from the first audio, the second audio source different from the first audio source.

Example 39 includes the apparatus of example 37, wherein the second spectral distance is in a range from 4 decibels (dB) to 6 dB.

Example 40 includes the apparatus of example 37, wherein the means for determining is to obtain a first audio signal from the first microphone, the first signal spectrum generated from the first audio signal via a Fourier transform, the first signal spectrum including amplitudes and frequencies corresponding to the first audio.

Example 41 includes the apparatus of example 37, wherein the means for determining is to obtain a second audio signal from the second microphone, the second signal spectrum generated from the second audio signal via a Fourier transform, the second signal spectrum including amplitudes and frequencies corresponding to the first audio.

Example 42 includes the apparatus of example 37, wherein the third signal spectrum is an enhanced signal spectrum corresponding to the first microphone.

Example 43 includes the apparatus of example 37, wherein the mask is a ratio between the second signal spectrum and the first signal spectrum.

Example 44 includes the apparatus of example 43, wherein the ratio is a factor, the factor bounded from 0 to 1.

Example 45 includes the apparatus of example 44, wherein the means for generating is to multiply the first signal spectrum by the factor to generate the third signal spectrum.

Example 46 includes the apparatus of example 37, wherein the first signal spectrum has a first bandwidth and the second signal spectrum has a second bandwidth, the second bandwidth greater than the first bandwidth.

Example 47 includes the apparatus of example 37, wherein the first signal spectrum has a first dynamic range and the second signal spectrum has a second dynamic range, the second dynamic range greater than the first dynamic range.

Example 48 includes the apparatus of example 37, wherein the means for generating is to generate the third signal spectrum via a neural network, the neural network utilizing the mask.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for enhancing an audio signal, the apparatus comprising:
at least one memory;
instructions; and
processor circuitry to execute the instructions to at least:
determine a first signal spectrum corresponding to a first microphone, the first signal spectrum identifying first audio from a first audio source;
determine a second signal spectrum corresponding to a second microphone, the second signal spectrum identifying the first audio, the second signal spectrum different from the first signal spectrum, the first microphone different from the second microphone, the second signal spectrum having a first spectral distance to the first signal spectrum;
calculate a mask based on the first and second signal spectrums; and
generate a third signal spectrum corresponding to the first microphone utilizing the mask and the first signal spectrum, the third signal spectrum different from the first signal spectrum, the third signal spectrum having a second spectral distance to the second signal spectrum, the second spectral distance less than the first spectral distance.

2. The apparatus of claim 1, wherein the processor circuitry is to generate a fourth signal spectrum corresponding to the first microphone utilizing the mask, the fourth signal spectrum identifying second audio from a second audio source, the second audio different from the first audio, the second audio source different from the first audio source.

3. The apparatus of claim 1, wherein the second spectral distance is in a range from 4 decibels (dB) to 6 dB.

4. The apparatus of claim 1, wherein the processor circuitry is to obtain a first audio signal from the first microphone, the first signal spectrum generated from the first audio signal via a Fourier transform, the first signal spectrum including amplitudes and frequencies corresponding to the first audio.

5. The apparatus of claim 1, wherein the processor circuitry is to obtain a second audio signal from the second microphone, the second signal spectrum generated from the second audio signal via a Fourier transform, the second signal spectrum including amplitudes and frequencies corresponding to the first audio.

6. The apparatus of claim 1, wherein the third signal spectrum is an enhanced signal spectrum corresponding to the first microphone.

7. The apparatus of claim 1, wherein the mask is a ratio between the second signal spectrum and the first signal spectrum.

8. The apparatus of claim 7, wherein the ratio is a factor, the factor bounded from 0 to 1.

9. The apparatus of claim 8, wherein the processor circuitry is to multiply the first signal spectrum by the factor to generate the third signal spectrum.

10. The apparatus of claim 1, wherein the first signal spectrum has a first bandwidth and the second signal spectrum has a second bandwidth, the second bandwidth greater than the first bandwidth.

11. The apparatus of claim 1, wherein the first signal spectrum has a first dynamic range and the second signal spectrum has a second dynamic range, the second dynamic range greater than the first dynamic range.

12. The apparatus of claim 1, wherein the third signal spectrum is generated via a neural network, the neural network utilizing the mask.

13. At least one non-transitory computer readable medium for enhancing an audio signal comprising computer readable instructions that, when executed, cause at least one processor to at least:
determine a first signal spectrum corresponding to a first microphone, the first signal spectrum identifying first audio from a first audio source;
determine a second signal spectrum corresponding to a second microphone, the second signal spectrum identifying the first audio, the second signal spectrum different from the first signal spectrum, the first microphone different from the second microphone, the second signal spectrum having a first spectral distance to the first signal spectrum;
calculate a mask based on the first and second signal spectrums; and
generate a third signal spectrum corresponding to the first microphone utilizing the mask, the third signal spectrum different from the first signal spectrum, the third signal spectrum having a second spectral distance to the second signal spectrum, the second spectral distance less than the first spectral distance.

14. The at least one non-transitory computer readable medium of claim 13, wherein the instructions cause the at least one processor to generate a fourth signal spectrum corresponding to the first microphone utilizing the mask, the fourth signal spectrum identifying second audio from a second audio source, the second audio different from the first audio, the second audio source different from the first audio source.

15. The at least one non-transitory computer readable medium of claim 13, wherein the instructions cause the at least one processor to obtain a first audio signal from the first microphone, the first signal spectrum generated from the first audio signal via a Fourier transform, the first signal spectrum including amplitudes and frequencies corresponding to the first audio.

16. The at least one non-transitory computer readable medium of claim 13, wherein the instructions cause the at least one processor to obtain a second audio signal from the second microphone, the second signal spectrum generated from the second audio signal via a Fourier transform, the second signal spectrum including amplitudes and frequencies corresponding to the first audio.

17. The at least one non-transitory computer readable medium of claim 13, wherein the third signal spectrum is an enhanced signal spectrum corresponding to the first microphone.

18. The at least one non-transitory computer readable medium of claim 13, wherein the mask is a ratio between the second signal spectrum and the first signal spectrum.

19. An apparatus for enhancing an audio signal, the apparatus comprising:

means for determining to:

determine a first signal spectrum corresponding to a first microphone, the first signal spectrum identifying first audio from a first audio source;

determine a second signal spectrum corresponding to a second microphone, the second signal spectrum identifying the first audio, the second signal spectrum different from the first signal spectrum, the first microphone different from the second microphone, the second signal spectrum having a first spectral distance to the first signal spectrum;

means for calculating to calculate a mask based on the first and second signal spectrums; and means for generating to generate a third signal spectrum corresponding to the first microphone utilizing the mask, the third signal spectrum different from the first signal spectrum, the third signal spectrum having a second spectral distance to the second signal spectrum, the second spectral distance less than the first spectral distance.

20. The apparatus of claim 19, wherein the means for generating is to generate a fourth signal spectrum corresponding to the first microphone utilizing the mask, the fourth signal spectrum identifying second audio from a second audio source, the second audio different from the first audio, the second audio source different from the first audio source.

21. The apparatus of claim 19, wherein the third signal spectrum is an enhanced signal spectrum corresponding to the first microphone.

22. The apparatus of claim 19, wherein the mask is a ratio between the second signal spectrum and the first signal spectrum.

23. The apparatus of claim 19, wherein the first signal spectrum has a first bandwidth and the second signal spectrum has a second bandwidth, the second bandwidth greater than the first bandwidth.

24. The apparatus of claim 19, wherein the first signal spectrum has a first dynamic range and the second signal spectrum has a second dynamic range, the second dynamic range greater than the first dynamic range.

25. The apparatus of claim 19, wherein the means for generating is to generate the third signal spectrum via a neural network, the neural network utilizing the mask.

* * * * *